United States Patent
Dean et al.

(10) Patent No.: US 6,202,206 B1
(45) Date of Patent: *Mar. 13, 2001

(54) SIMULTANEOUS INSTALLATION AND CONFIGURATION OF PROGRAMS AND COMPONENTS INTO A NETWORK OF SERVER AND CLIENT COMPUTERS

(75) Inventors: Jeffrey Randell Dean; Jeffrey Langdon Howard; Ingrid Milagros Rodriguez, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/078,965

(22) Filed: May 14, 1998

(51) Int. Cl.[7] .................................................. G06F 9/445
(52) U.S. Cl. ............................................. 717/11; 709/220
(58) Field of Search ............................. 395/712; 709/220, 709/221, 203, 219; 345/349, 333; 717/11; 710/1

(56) References Cited

U.S. PATENT DOCUMENTS

| | | | | |
|---|---|---|---|---|
| 5,247,683 | * | 9/1993 | Holmes et al. ...................... | 709/221 |
| 5,287,514 | * | 2/1994 | Gram ................................... | 345/333 |
| 5,367,686 | * | 11/1994 | Fisher et al. ......................... | 395/712 |
| 5,502,839 | * | 3/1996 | Kolnick ................................ | 710/1 |
| 5,760,768 | * | 6/1998 | Gram ................................... | 345/333 |
| 5,768,510 | * | 6/1998 | Gish .................................... | 709/203 |
| 5,825,361 | * | 10/1998 | Rubin et al. ......................... | 345/349 |
| 5,838,916 | * | 11/1998 | Domenikos et al. ................ | 709/219 |
| 5,841,972 | * | 11/1998 | Fanshier .............................. | 709/220 |
| 5,845,090 | * | 12/1998 | Collins, III et al. ................. | 709/221 |
| 5,860,012 | * | 1/1999 | Luu ..................................... | 717/11 |
| 6,052,719 | * | 4/2000 | Bezanson et al. ................... | 709/220 |

* cited by examiner

*Primary Examiner*—Mark R. Powell
*Assistant Examiner*—Hoang-Vu Antony Nguyen-Ba
(74) *Attorney, Agent, or Firm*—J. B. Kraft; L. A. Van Leeuwen

(57) ABSTRACT

A method for installing programs, settings and configurations in a network of a plurality of server and client computers is provided which involves the steps of designating one of said server computers having an interactive display interface to function as the primary server computer, preloading all of the programs to be installed in said server and client computers of the network into the primary server computer and running a sequence of the keystroke and cursor entries required to install said selected components and programs on said server and client computers as recorded in a data file representative of said sequence of entries stored in said primary server computer, whereby said programs and components are automatically loaded into the respective server and client computers in said network requiring said programs and components.

16 Claims, 30 Drawing Sheets

Specifying client information

Enter general configuration information for client computer 2.

Computer name: NEWTON

Name of registered user: Newton Rodriguez

Windows 95 requires you to provide a CD key. The CD key is assigned to a single license of the operating system. Enter the CD key for this system.

Windows 95 CD key: 443 - 5475873

GENERAL
Windows 95

SERVER — 75
CLIENT — 76

[ <Back ] [ Next > ] [ Cancel ] [ Help ]

FIG. 16

Reviewing the profile summary

Examine the profile. Click the PLUS SIGN (+) to expand an item; click the MINUS SIGN (-) to collapse it. Click a name in the tree to display its attributes. All columns can be resized by dragging their borders.

(-) ☐ Customer Profile
- (-) PILOT
  - ○ Lotus Domino Intranet Starter Pack
  - ○ Netscape Navigator 3.01
  - ○ IBM DB2 Server 21.2
- (-) PACO
  - ○ Microsoft Office 97 Professional Edition
  - ○ QuickBooks Pro 5.0 by Intuit
- (-) NEWTON
  - ○ Microsoft Office 97 Professional Edition
  - ○ QuickBooks Pro 5.0 by Intuit
- (-) PILOT
  - ○ Microsoft Office 97 Professional Edition
  - ○ QuickBooks Pro 5.0 by Intuit

| Attribute | Value |
|---|---|
| Company Name | Paco's Repair Shop |
| Contact Name | Paco Rodriguez |
| Contact's Job Role | Owner |
| Number of Servers | 1 |
| Number of Clients | 3 |
| Same OS Among Clients | Yes |
| Same Server App Config | Yes |
| Same Client App Config | Yes |
| Bitmap File | C:\Program Files\Ins. |
| Domain Name | PILOTDM |
| Use DHCP | No |
| Subnet Mask | 255.255.255.0 |
| Default Gateway | 0.0.0.0 |

<Back   Next >   Cancel   Help

FIG. 22

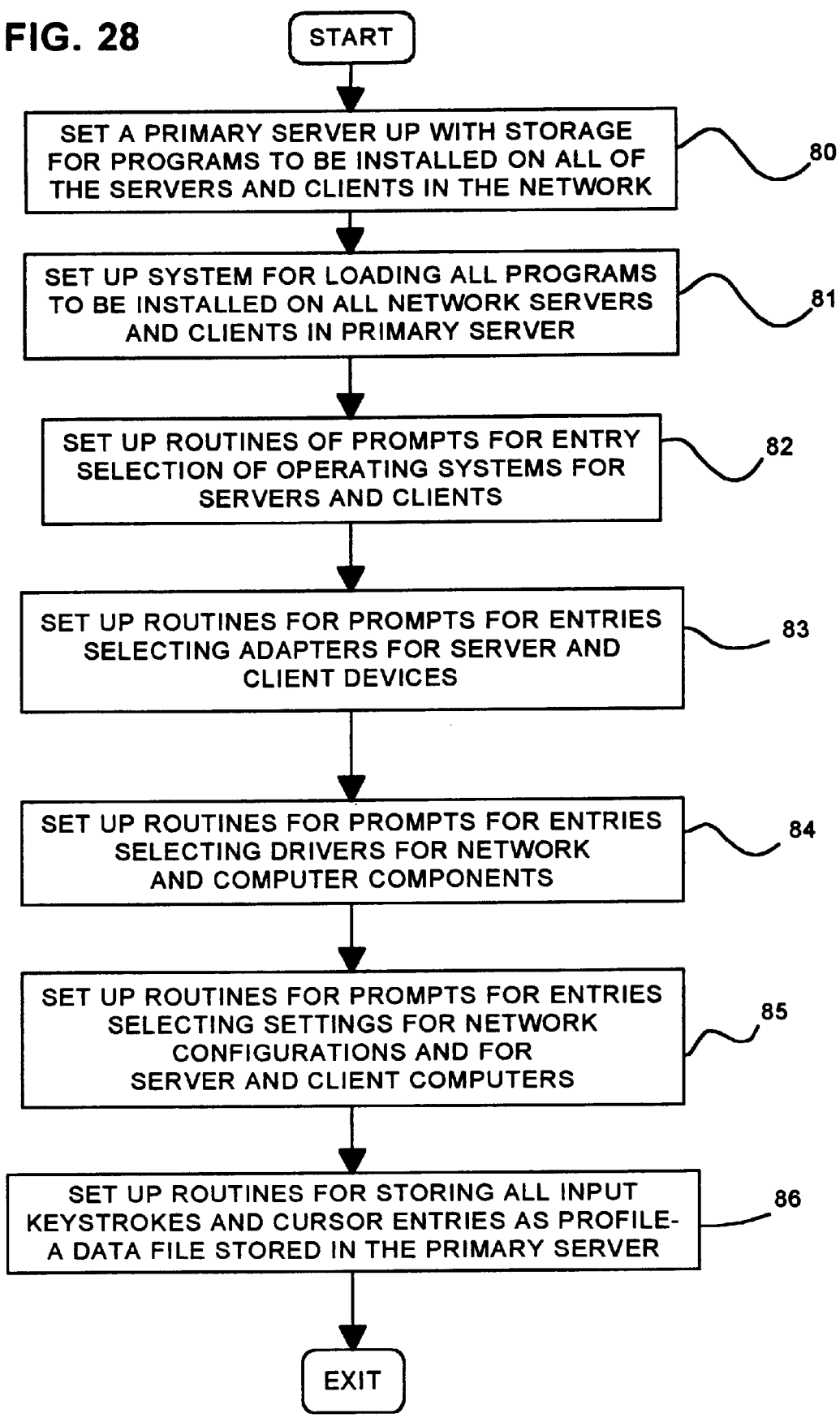

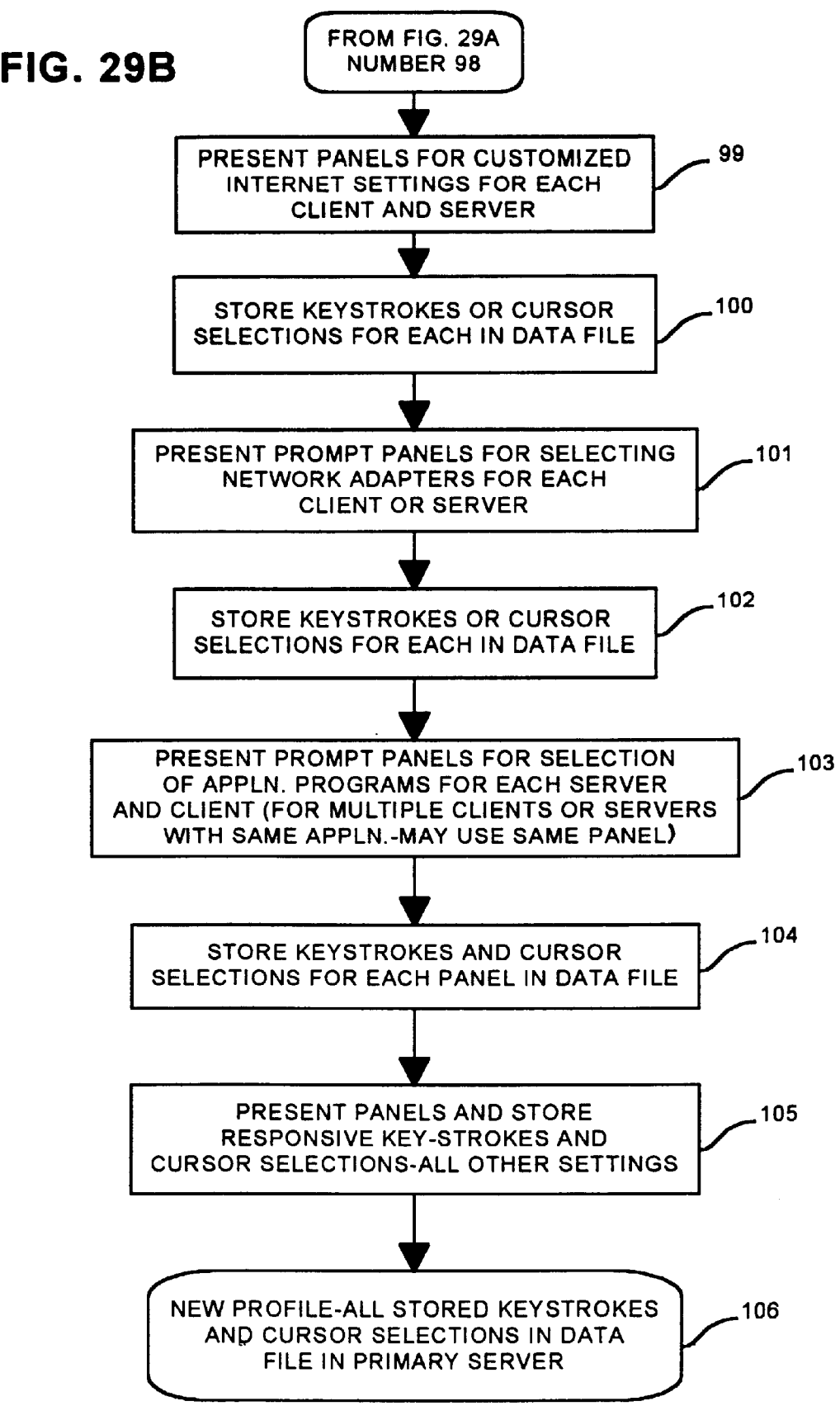

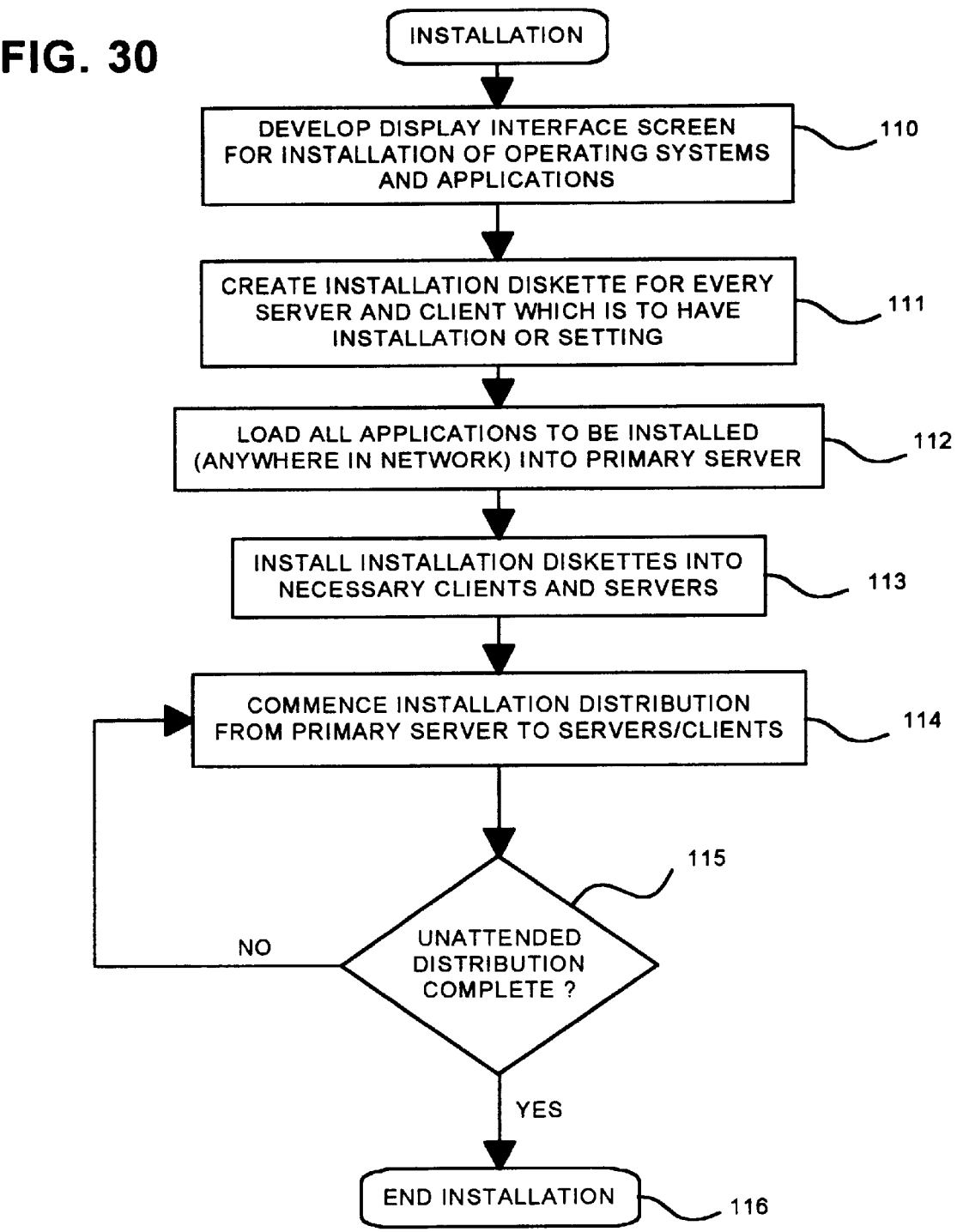

SIMULTANEOUS INSTALLATION AND CONFIGURATION OF PROGRAMS AND COMPONENTS INTO A NETWORK OF SERVER AND CLIENT COMPUTERS

CROSS-REFERENCE TO RELATED COPENDING PATENT APPLICATIONS

The following patent applications, which are assigned to the assignee of the present invention and filed concurrently herewith, cover subject matter related to the subject matter of the present invention: "A STORED FILE OF PRERECORDED KEYSTROKES AND CURSOR SELECTIONS FOR CONTROLLING AUTOMATIC INSTALLATION AND CONFIGURATION OF PROGRAMS AND COMPONENTS IN A NETWORK OF SERVER AND CLIENT COMPUTERS", Bezanson, Chuang and Rodriguez; and "CONTROLLING THE INSTALLATION AND CONFIGURATION OF PROGRAMS AND COMPONENTS IN A NETWORK OF SERVER AND CLIENT COMPUTERS THROUGH ENTRIES INTO A PRIMARY SERVER COMPUTER", Dean, Howard and Rodriguez.

TECHNICAL FIELD

The present invention relates to a method and program for the configuration of a computer network and particularly a local network of server computers and client computers or the modification of the configuration of such a network in a manner which is expeditious and involves very little down-time of the network or its components.

BACKGROUND OF THE INVENTION

Computers and their application programs are used in all aspects of business, industry and academic endeavors. In recent years, there has been technological revolution driven by the convergence of the data processing industry with the consumer electronics industry. This advance has been even further accelerated by the extensive consumer and business involvement in the Internet in recent years. As a result of these changes, it seems as if virtually all aspects of human productivity in the industrialized world requires human and computer interaction. The computer industry has been a force for bringing about great increases in business and industrial productivity. Almost every week seems to bring computer industry advances which promise even further increases in productivity. These advances offer to drive down business and industry costs and increase efficiency in addition to increasing productivity. In addition, the cost of "computer power" continues to drop as a result of rapid advances in computer related technologies.

Despite all of these advantages, there still remains great resistance in all industries and business fields to new computer systems and significant system upgrades which offer much in productivity increases. This resistance results from past experience which equates installing new computer systems or significant upgrades in existing systems with large amounts of down-time during which the business, manufacturing facility or individual worker functions are inoperative or operate at diminished levels. When a business or production facility is trying to decide whether to install a new or significantly upgraded computer system, the concern about down-time, the possible loss of business, as well as stress on the workers involved very often outweighs the cost of the installation in influencing the decision. The concern about business and production delays resulting from installation has become so great that fewer and fewer of even small businesses are still trying to make system and program changes on their own. The professional computer service industry which carries out and supports installations and upgrades for the business and industrial sector has been rapidly expanding over the past decade. However, even with such computer professional support, the threat of such down-time coupled with the costs of such professional services caused by installation delays remains of great concern.

SUMMARY OF THE INVENTION

The present invention together with the above cross-referenced concurrently filed copending patent applications provide solutions which are directed to minimizing the time required for installation and configuration, as well as the significant upgrading of networks made up of a plurality of server computers having groups of client computers connected to each server computer. These inventions further minimize the number of computers in the network which have to be involved in each stage of an installation to thereby permit some of the system to remain functional for as long as possible during an upgrade.

The above-mentioned copending application entitled "CONTROLLING THE INSTALLATION AND CONFIGURATION OF PROGRAMS AND COMPONENTS IN A NETWORK OF SERVER AND CLIENT COMPUTERS THROUGH ENTRIES INTO A PRIMARY SERVER COMPUTER", covers predetermining the internal and external components and the application programs to be supported by each of the server and client computers in the network and the interconnections between the server and client computers. One server computer having an interactive display interface is then designated as a primary server computer. Then, all of the interactive selection entries required to install all of the application programs and the driver programs which may be required to support said internal and external components of all of the other server and client computers in the network are then made into the interactive display interface of said primary server computer. The other of the copending applications entitled "A STORED FILE OF PRERECORDED KEYSTROKES AND CURSOR SELECTIONS FOR CONTROLLING AUTOMATIC INSTALLATION AND CONFIGURATION OF PROGRAMS AND COMPONENTS IN A NETWORK OF SERVER AND CLIENT COMPUTERS", covers storing this input in the primary server as a data file recording the exact keystroke and cursor selection entries required to install the selected programs and further configure the network.

The present invention uses the data files and other information developed during the preliminary processing which involved the primary server computer alone as covered by those two copending patent applications. The primary server loads all of the selected application programs onto their respective server and client computers and completes the network configuration under the control of the profile data file which is stored in the primary server computer. All of the selected programs to be installed throughout the network of server and client computers are first loaded into the primary server computer. Then, there is run the sequence of the keystroke and cursor entries required to install said selected components and programs on said server and client computers as recorded in a data file representative of said sequence of entries stored in said primary server computer. As a result, the programs and components are automatically loaded into the respective server and client computers in said network requiring said programs and components. The programs thus distributed include the operating systems for the server and client computers. Driver programs, as well as programs supporting various selected adapters such as network adapters, are preloaded and distributed throughout the network in this manner. Also, all network settings and other configurations are done in this way.

With such an overall procedure provided by the present invention together with the above-referenced copending applications, most of the remaining computers in the network are free to continue to function during the time that all of the programs are being setup and preinstalled into the primary server computer. Also with such an arrangement, all of the problems should have been solved during the preliminary entry into the primary server computer so that the subsequent installation into the computers in the rest of the network should run smoothly and quickly.

BRIEF DESCRIPTION OF THE DRAWINGS

FIG. 16 is a diagrammatic view of an interactive dialog screen on the primary server for the entry to the data file of selected data specific to a second client computer in the network;

FIG. 22 is a diagrammatic view of an interactive dialog screen on the primary server to present to the viewer all of the data entries made to the primary server as the profile of the whole network configuration as stored in the data file;

FIG. 28 is a flowchart of the basic elements of the program in the primary server computer which enables the primary server to control the data entry and capture the keystrokes and cursor selections described with respect to FIGS. 3 through 27 in a data file;

FIG. 30 is a flowchart of the step involved in the distribution and installation of programs and the configuration of the network in accordance with the present invention.

DETAILED DESCRIPTION OF THE PREFERRED EMBODIMENT

Before going into the details of specific embodiments, it will be helpful to understand from a more general perspective the various elements and methods which may be related to the present invention as covered in the above-referenced copending patent applications. The present and copending applications are all directed to the goal of accomplishing all network installations, configurations or settings, whether these be new networks or reconfigured networks by designating a primary network server computer and then making all significant configurations, installations and settings to all of the other server computers and client computers in the network through and under the control of the primary server computer. This will result in a substantial saving of time and computer resources in configuring and installing on networks. Since all of the entries are made through the primary server, no other computer resources are tied up during the entry period. Also, to some practical degree, many of the installations and settings which are the same for a plurality of computers in the network may be made by simultaneous or single sets of entries covering the same entries or installations on the plurality of computers.

Accordingly, the copending Dean et al. application covers the general concept of making all of the entries for installations for all of the computers in the network through a primary server so that all of the network installations are under the control of the primary server. These are recorded and stored as keystrokes and cursor selections in a data file profile as covered in the copending Bezanson et al. patent application, which is subsequently used to control the configuration of the network and installations and settings on all of the computers in the network. The present patent application covers automatically and, wherever possible, simultaneously configuring the network and making all installations and settings on all of the computers in the network via the primary server computer based upon the previously recorded stored profile with application programs which have been previously loaded into the primary server computer for distribution during this automatic network configuration.

Figure 1:
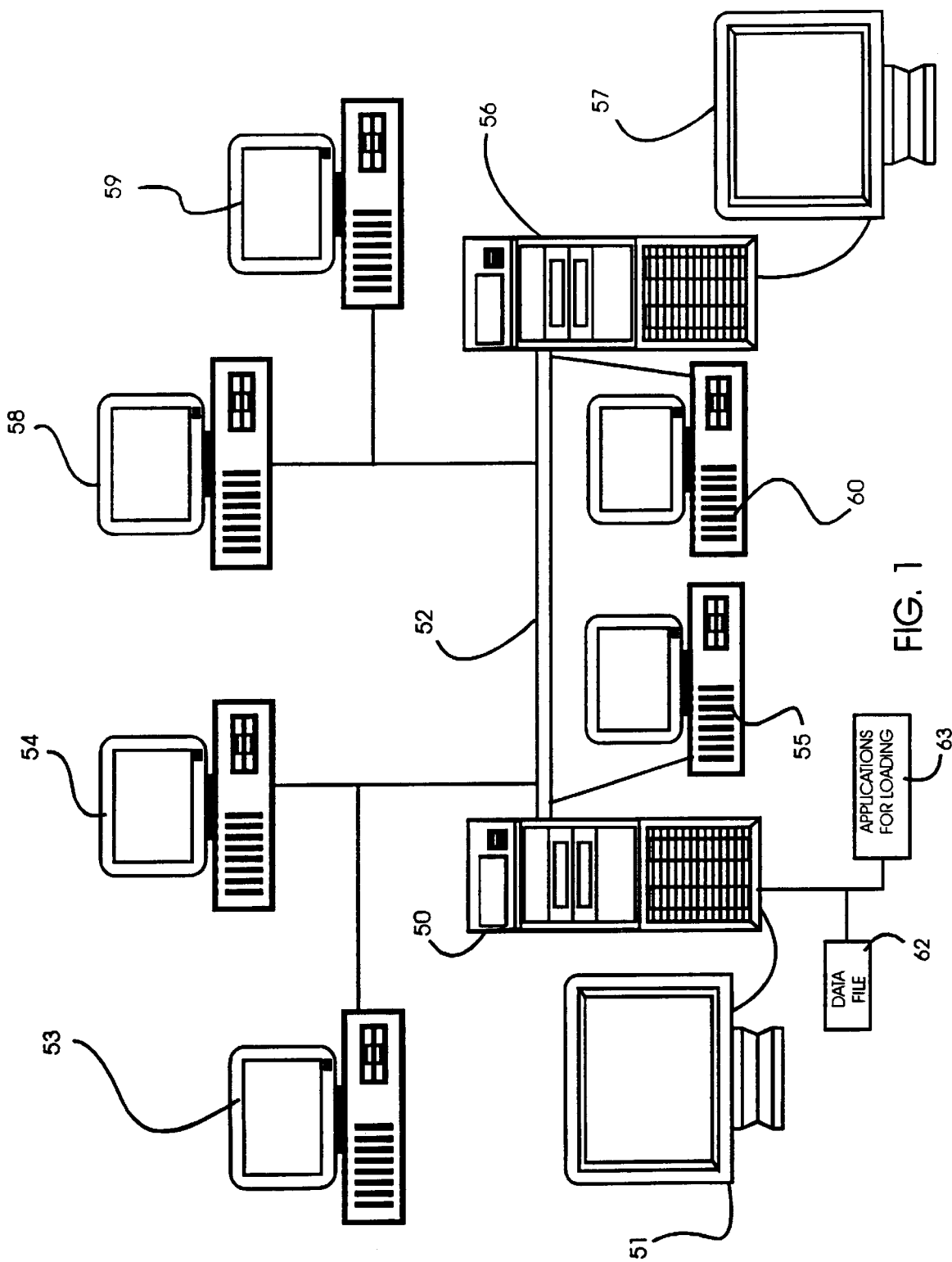
FIG. 1 is a generalized diagrammatic view of a network of server and client computers which may be configured using the data file and programming applications preloaded according to the present invention.

With reference to FIG. 1, there is shown a representative diagram of a local network 52 upon which the present invention may be illustrated. There are two server computers 50 and 56 of which server 50 is to function as the primary server. Each server respectively has a plurality of client computers: clients 55, 53 and 54 are served by primary server 50 while server 56 serves clients 58, 59 and 60. As will be subsequently described with respect to FIGS. 3 through 27, all configuration entries and settings are made into and stored in primary server 50 through its display interface 51. All programs for the network and for the computers in the network are also loaded into server 50 and stored for subsequent installation. Data file 62 is a diagrammatic representation of the stored record of keystroke and cursor selections, and storage facility 63 is for the preliminary loading of network computer applications prior to their distribution as selected throughout the network.

Figure 2:
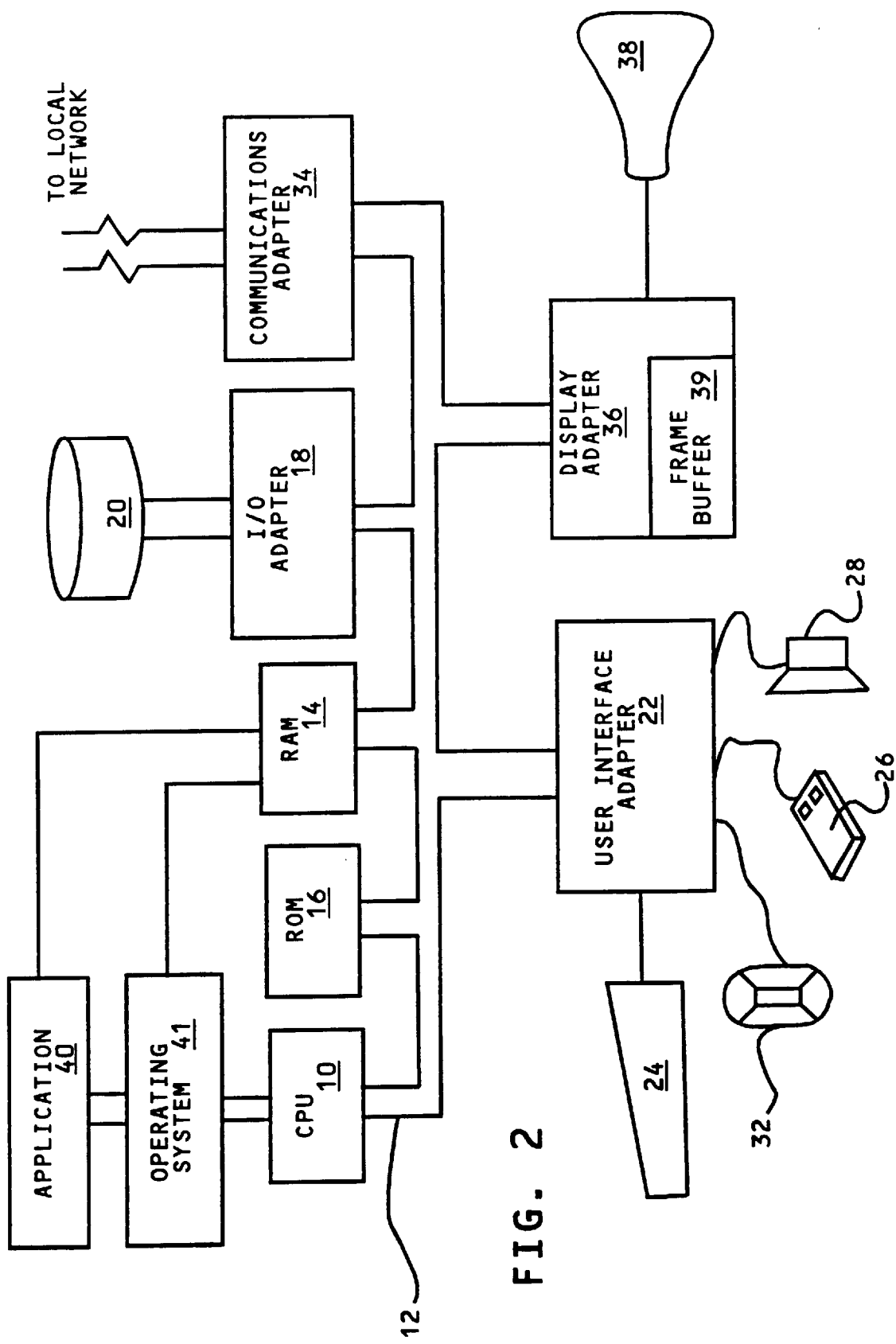
FIG. 2 is a block diagram of an interactive data processor controlled workstation display system including a central processing unit which is capable of serving as the primary server through which the applications may be distributed and settings made throughout network based upon the data file profile.

FIG. 2 is a diagram of a display interface workstation which can function as the primary server 50. A central processing unit (CPU) such as in one of the PC Server series of workstations available from International Business Machines Corporation or the Poweredge® 2200 server from Dell Corporation is provided and interconnected to various other components by system bus 12. An operating system 41 runs on CPU 10 and provides control and is used to coordinate the function of the various components of FIG. 2. Operating system 41 may be one of the commercially available operating systems such as Microsoft's Windows NT™, the OS/2 operating system available from International Business Machines Corporation (OS/2 is a trademark of International Business Machines Corporation); Microsoft's Windows 95™, as well as UNIX or AIX operating systems. The programming applications for controlling all of the entries and installations to be subsequently described for FIGS. 3 through 27, application and for subsequently loading and distributing programs and settings throughout the network, application 40, runs in conjunction with operating system 41 and provides output calls to the operating system 41 which implement the various functions to be performed by the application 40. A read only memory (ROM) 16 is connected to CPU 10 via bus 12 and includes the basic input/output system (BIOS) that controls the basic computer functions. Random access memory (RAM) 14 which will provide for a portion of the basic storage of entries to be subsequently described, I/O adapter 18 and communications adapter 34 are also interconnected to system bus 12. It should be noted that software components, including the operating system 41 and the application 40, are loaded into RAM 14 which is the computer system's main memory. I/O adapter 18 conventionally communicates with the disk storage device 20, i.e. a hard drive which may also be involved in the subsequently described storage. Communications adapter 34 interconnects bus 12 with the rest of the local network described in FIG. 1 enabling the data processing system to communicate with its client computers, as well as other servers and client computers to control entries, configurations and installations to be subsequently described. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described, with respect to the display screens of FIGS. 3 through 27, a simple illustration of how the data files of keystroke and cursor entries which will control the subsequent program loading and network configuration are developed. When the screen images are described it will be understood that these may be rendered by storing an image and text creation programs such as those in any conventional window operating system in the RAM 14 of the system of FIG. 2. The operating system is diagrammatically shown in FIG. 2 as operating system 41. Display screen images are presented to the viewer on display monitor 38 of FIG. 2. In accordance with conventional techniques, the user may control the screen interactively through a conventional I/O device such as mouse 26 of FIG. 2, which operates through user interface 22 to call upon programs in RAM 14 cooperating with the operating system 41 to create the images in frame buffer 39 of display adapter 36 to control the display on monitor 38.

Figure 3:
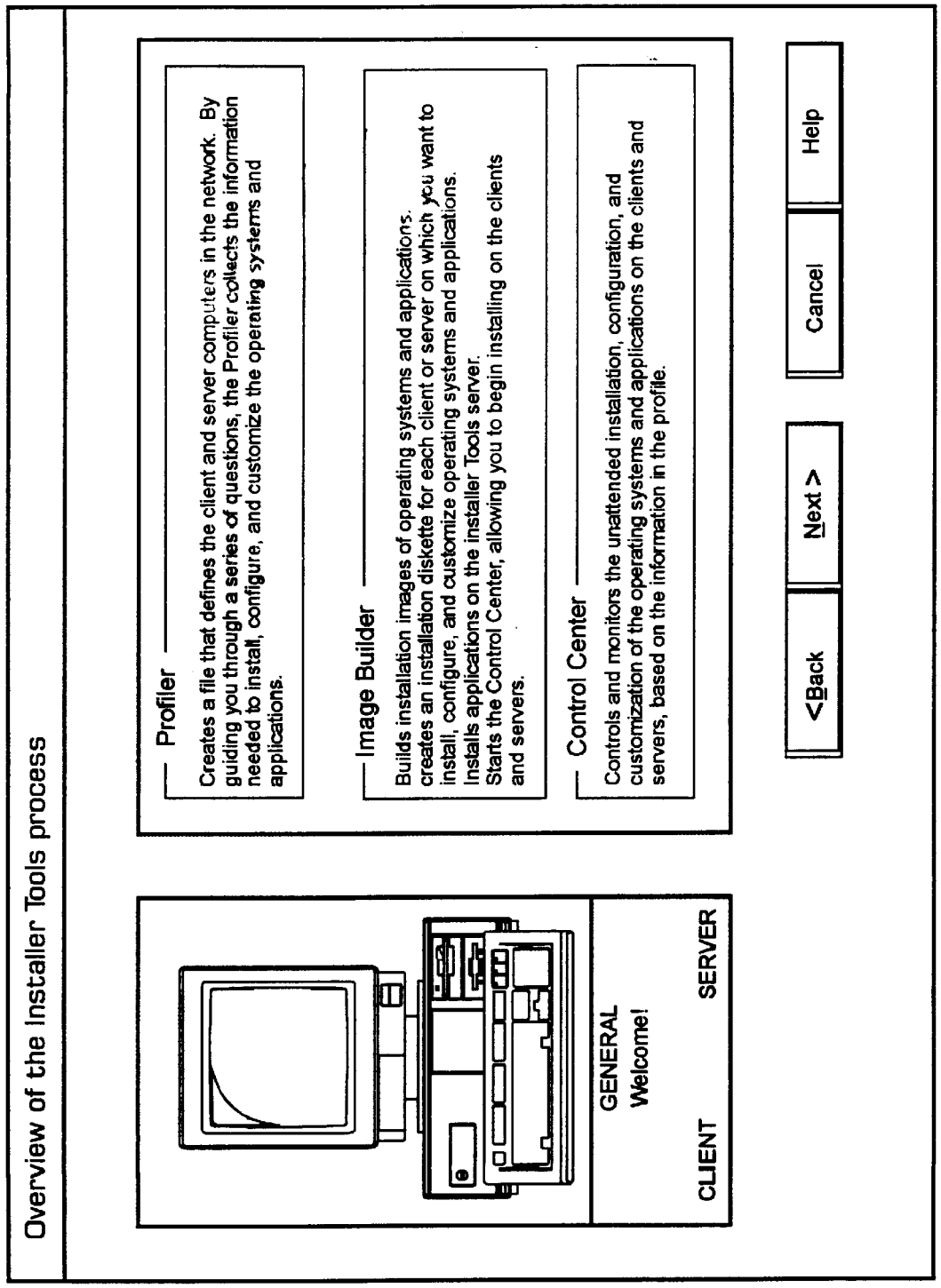
FIG. 3 is a diagrammatic view of an interactive dialog screen on the primary server setting forth the installation tools available to the installer.
Figure 4:
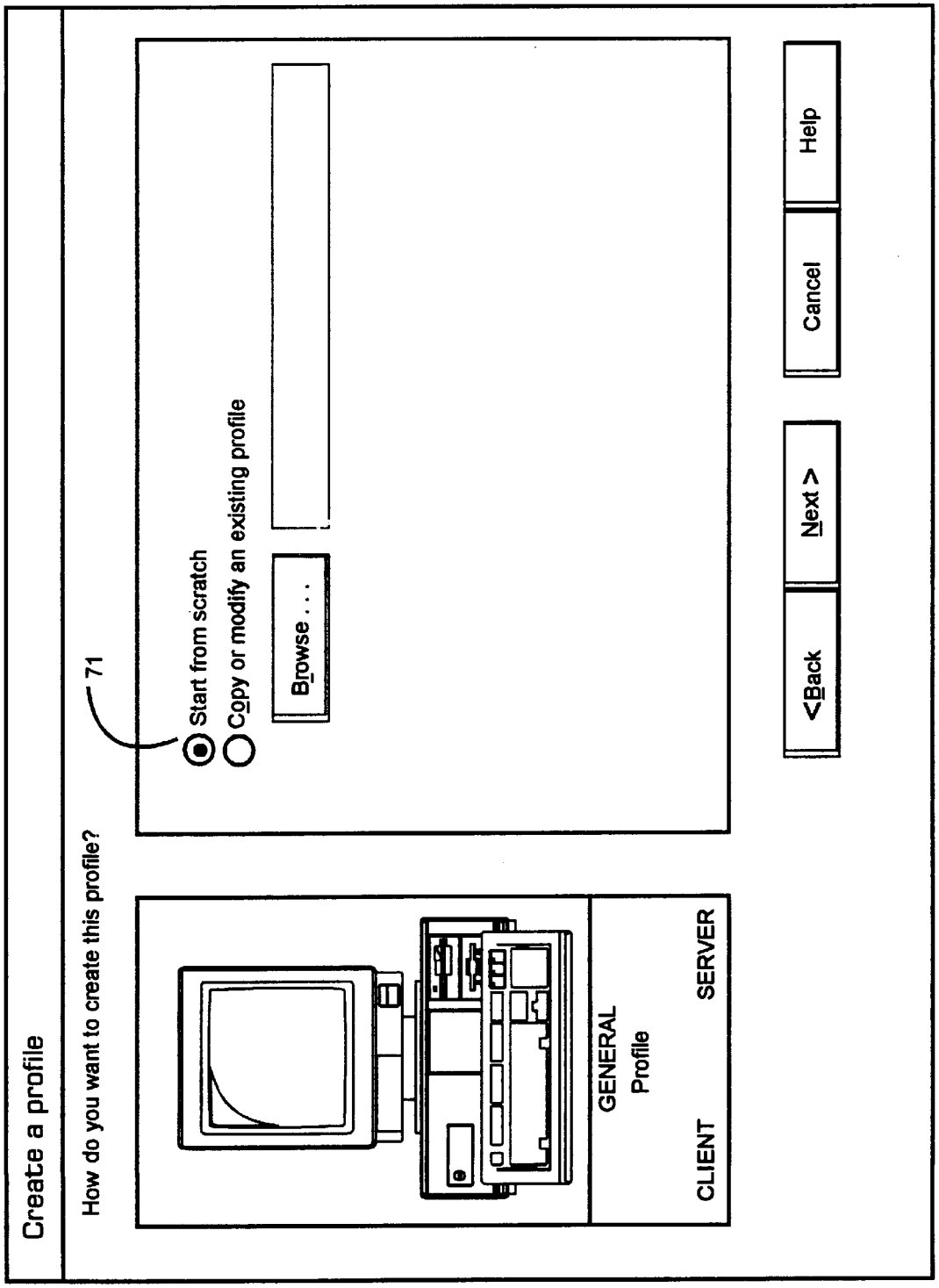
FIG. 4 is a diagrammatic view of an interactive dialog screen on the primary server for the data file entry of whether a decision of the change is an update or an entirely new configuration.

The initial display screen of FIG. 3 shows the introductory screen of the system on display of the primary server. It explains the distribution system of the present invention, as well as the element of the present system covered in the above-referenced copending patent applications.

It should be noted that although the present invention is applicable and has been used on network having a plurality of server computers, each with its plurality client computers, for convenience and conciseness in our illustration, the screen panels which follow will give the data entries for a portion of the network involving a server computer with several client computers.

Figure 5:
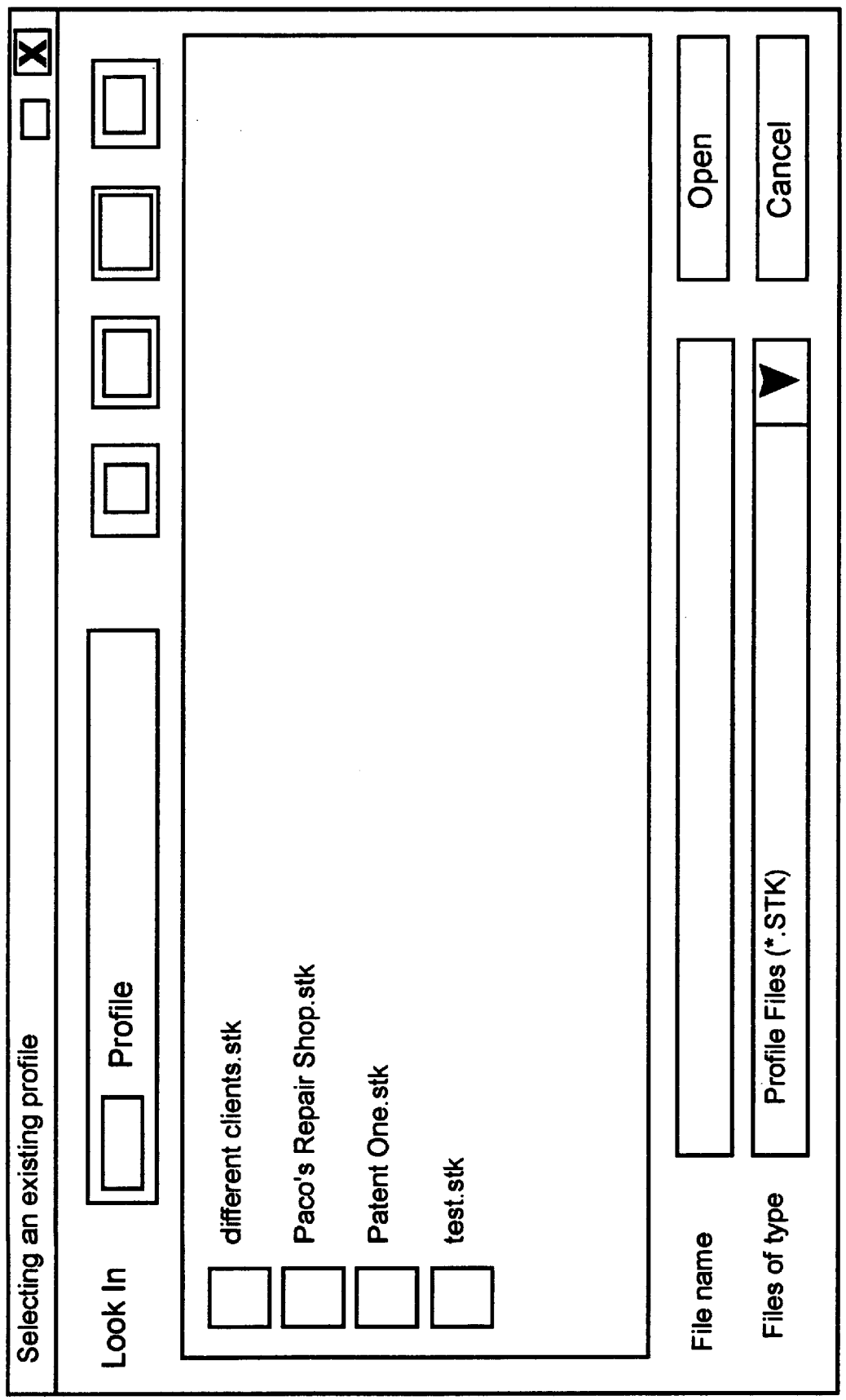
FIG. 5 is a diagrammatic view of an interactive dialog screen on the primary server for the initial entry to the data file of an update.
Figure 6:
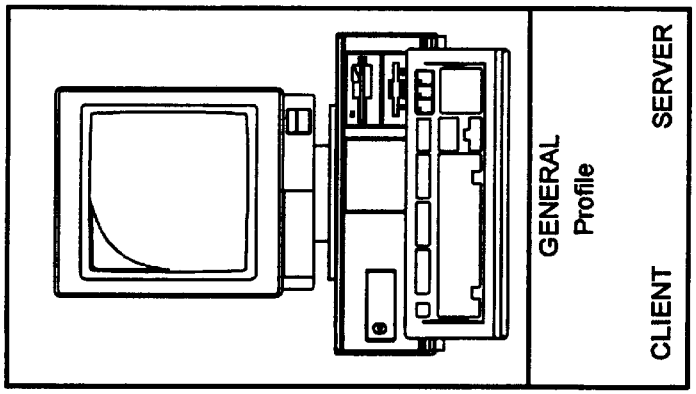
FIG. 6 is a diagrammatic view of an interactive dialog screen on the primary server for the initial entry to be recorded in the data file of a new configuration.
Figure 7:
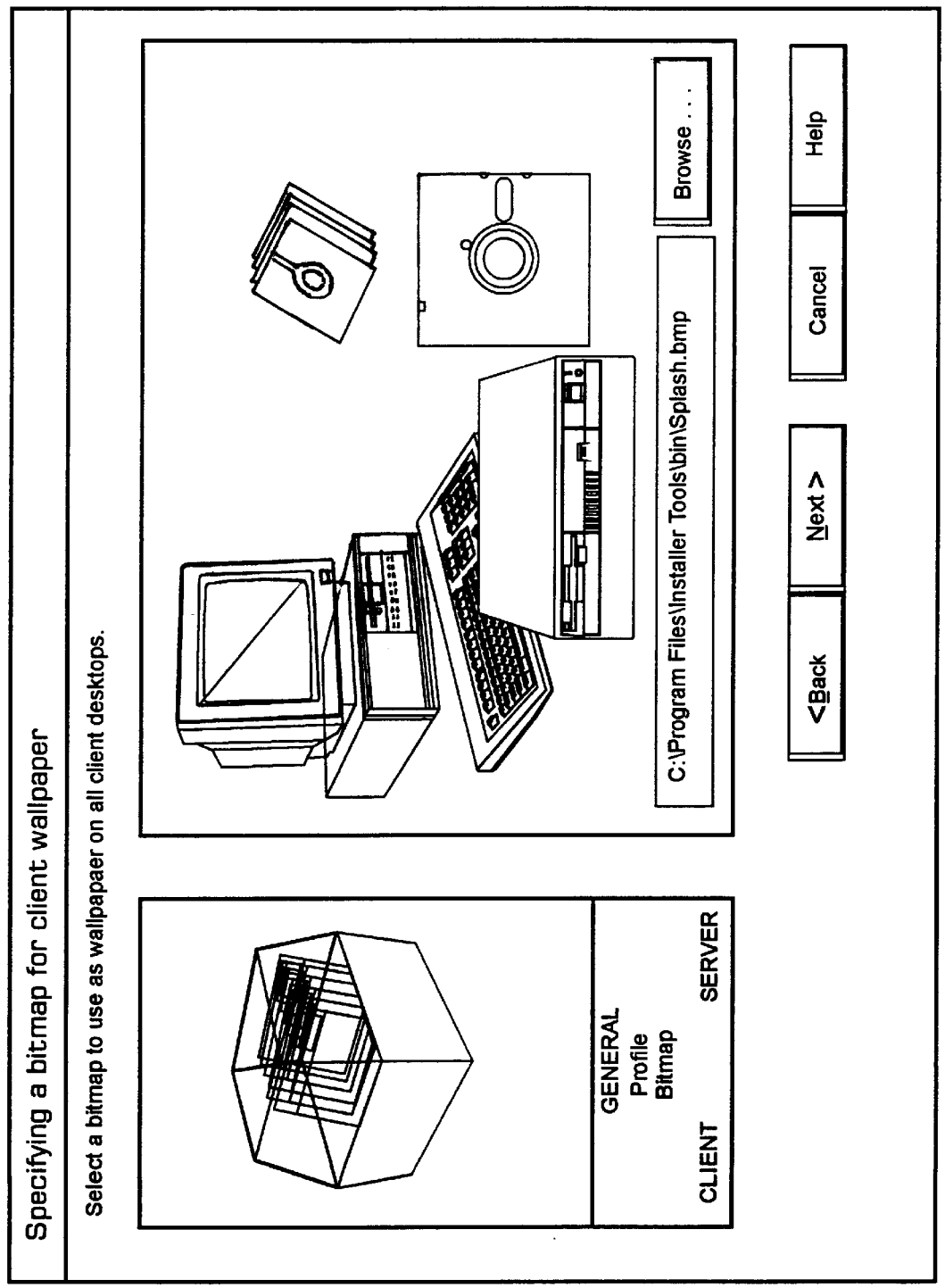
FIG. 7 is a diagrammatic view of an interactive dialog screen on the primary server for the entry to the data file of an overall setting.
Figure 8:
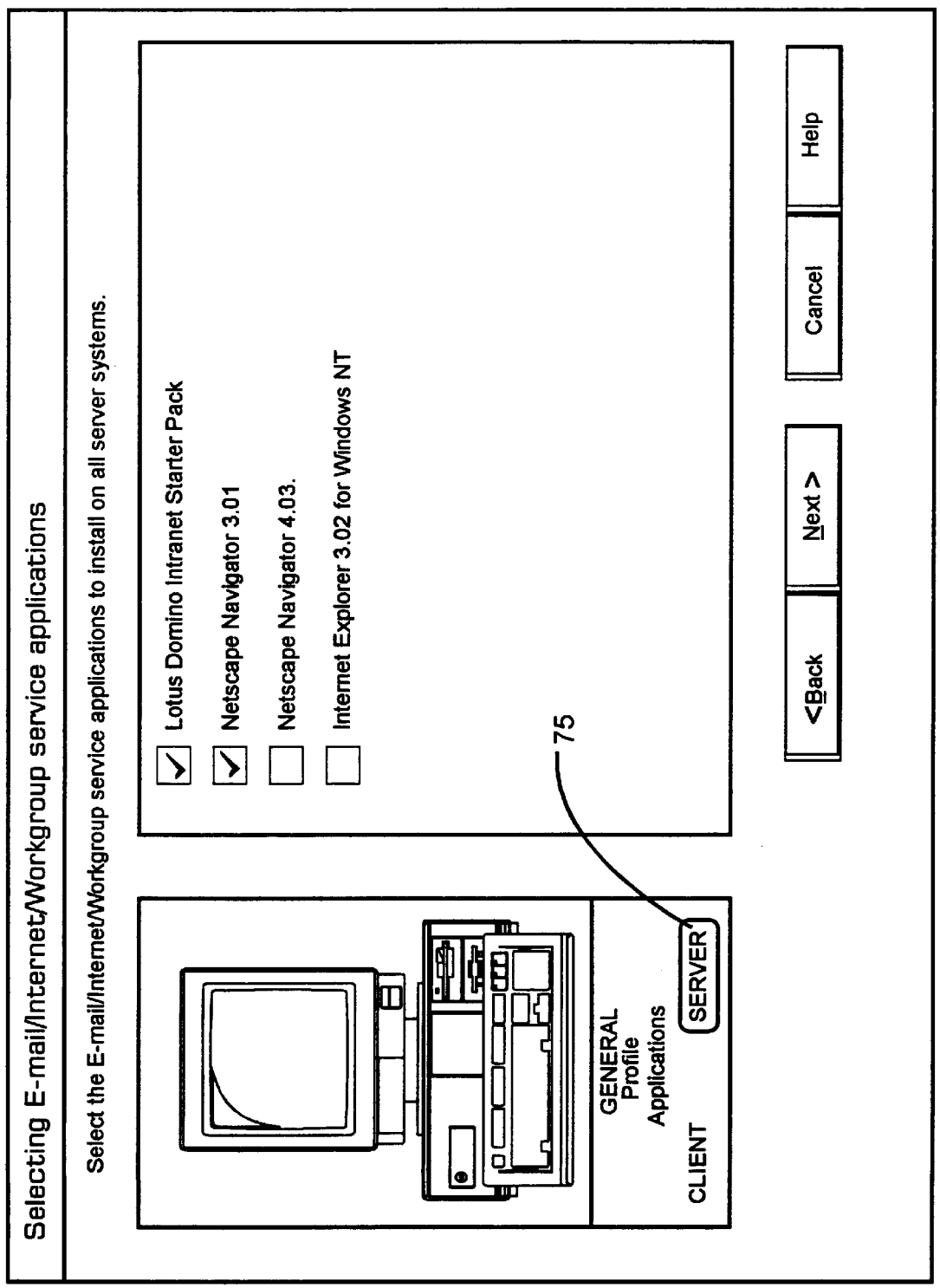
FIG. 8 is a diagrammatic view of an interactive dialog screen on the primary server for the entry to the data file choosing programming applications for the servers.
Figure 9:
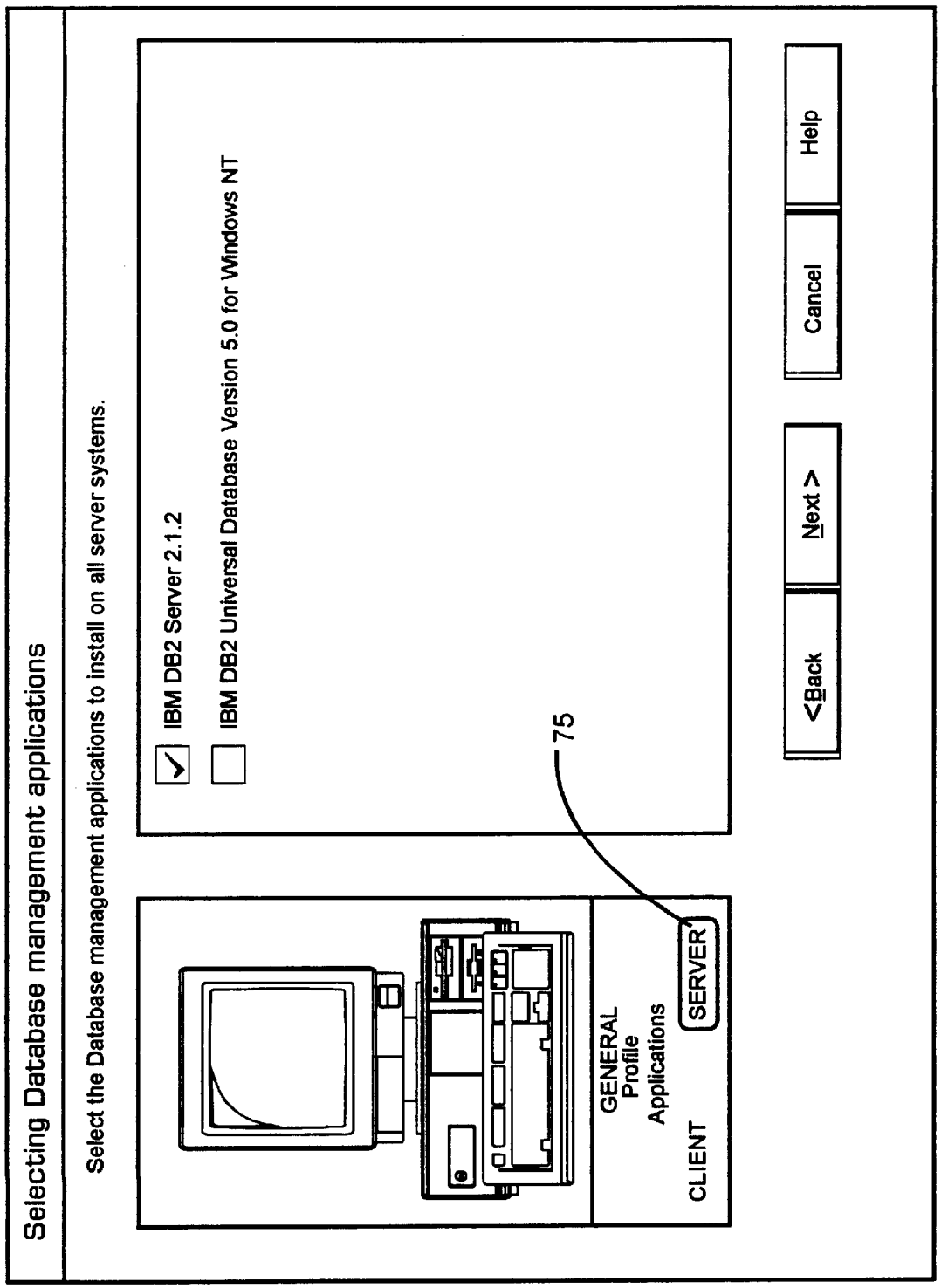
FIG. 9 is a diagrammatic view of an interactive dialog screen on the primary server for the entry to the data file choosing database management applications for the servers.
Figure 10:
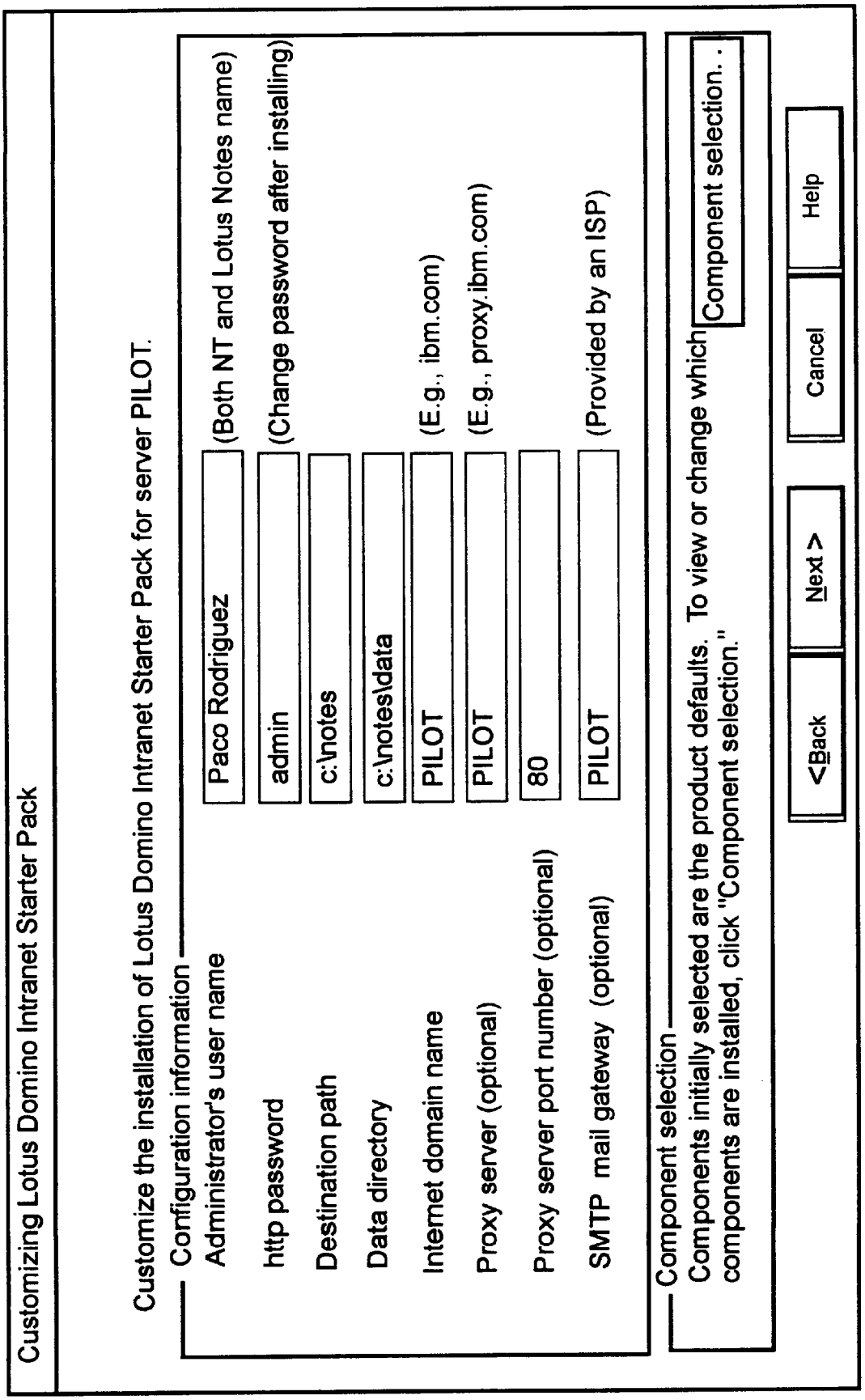
FIG. 10 is a diagrammatic view of an interactive dialog screen on the primary server for the entry to the data file of settings for the primary server.
Figure 11:
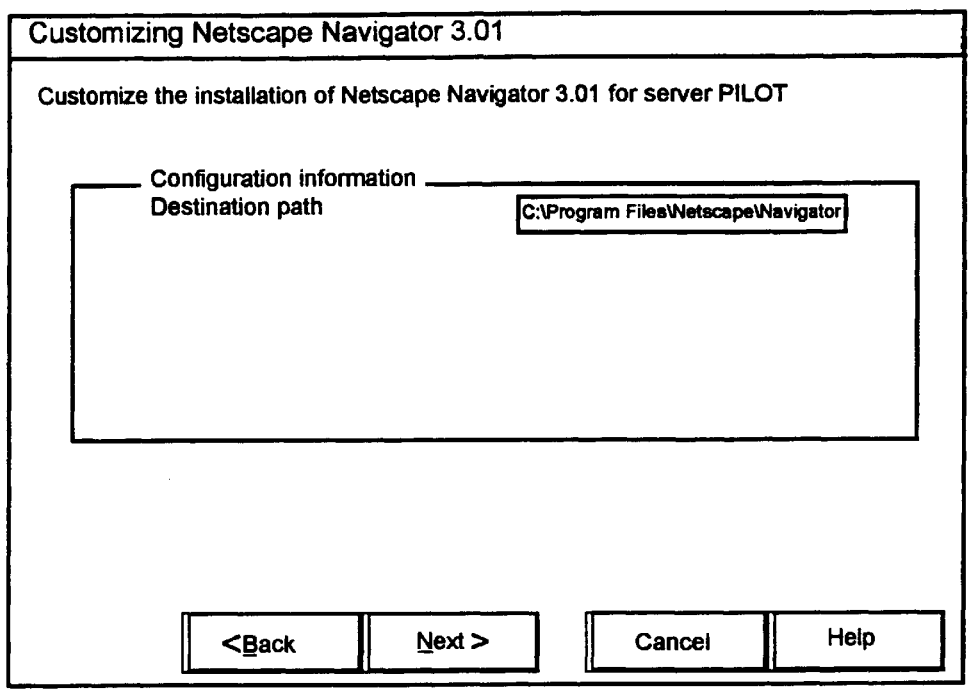
FIG. 11 is a diagrammatic view of an interactive dialog screen on the primary server for the entry to the data file of customized settings for an application to be installed on the primary server.
Figure 12:
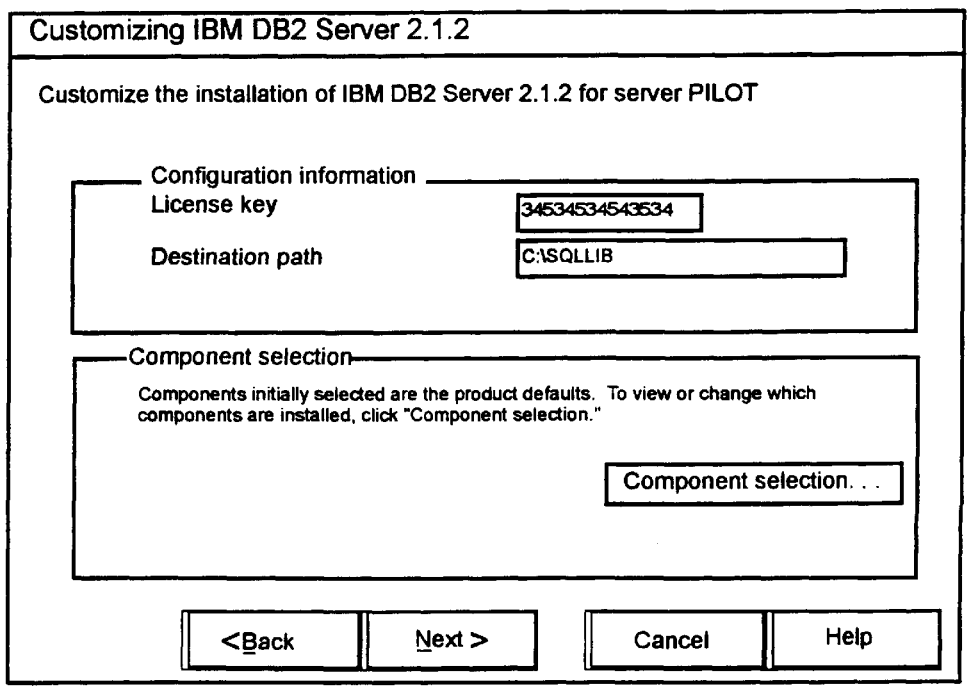
FIG. 12 is a diagrammatic view of an interactive dialog screen on the primary server for the entry to the data file of customized settings for another application to be installed on the primary server.
Figure 13:
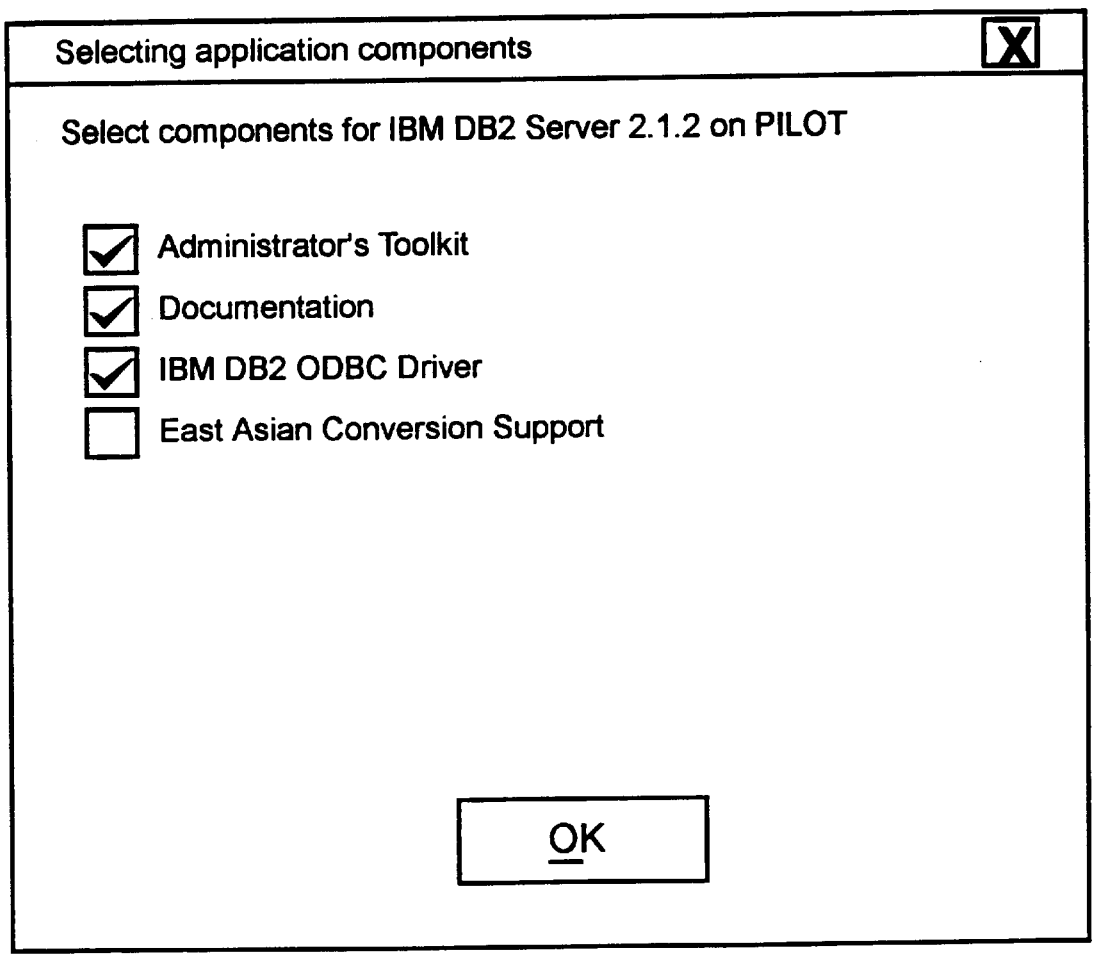
FIG. 13 is a diagrammatic view of an interactive dialog screen on the primary server for the entry to the data file of a component of the application entered via FIG. 12.
Figure 14:
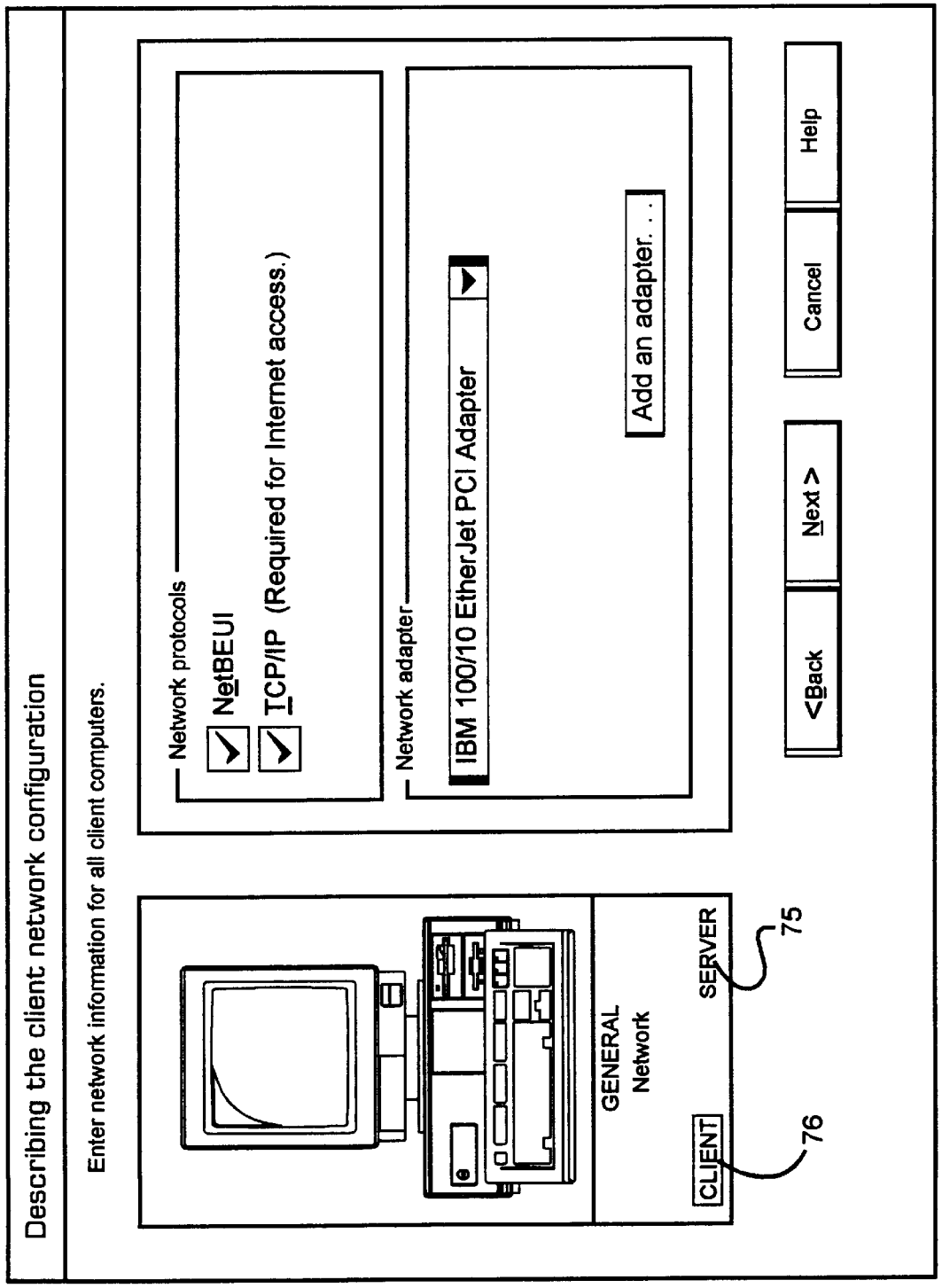
FIG. 14 is a diagrammatic view of an interactive dialog screen on the primary server for the entry to the data file of selections of the network protocols for all client computers in the network.
Figure 15:
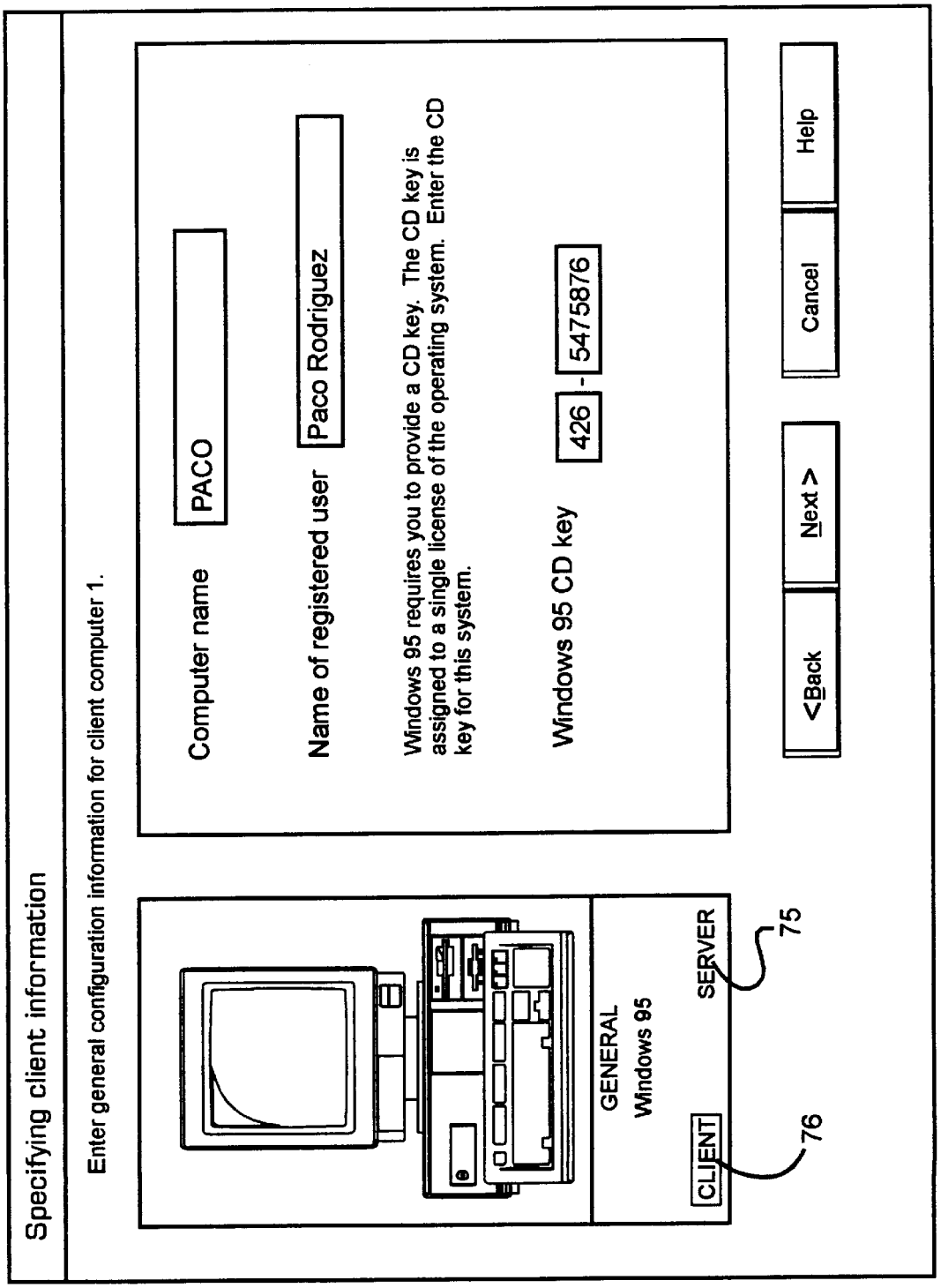
FIG. 15 is a diagrammatic view of an interactive dialog screen on the primary server for the entry to the data file of selected data specific to a first client computer in the network.
Figure 17:
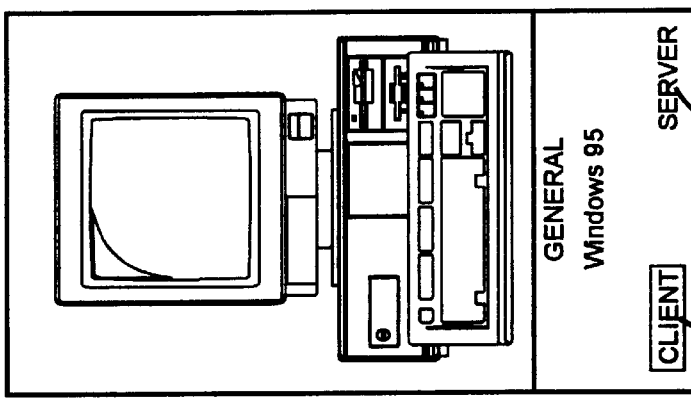
FIG. 17 is a diagrammatic view of an interactive dialog screen on the primary server for the entry to the data file of selected data specific to a third client computer in the network.
Figure 18:
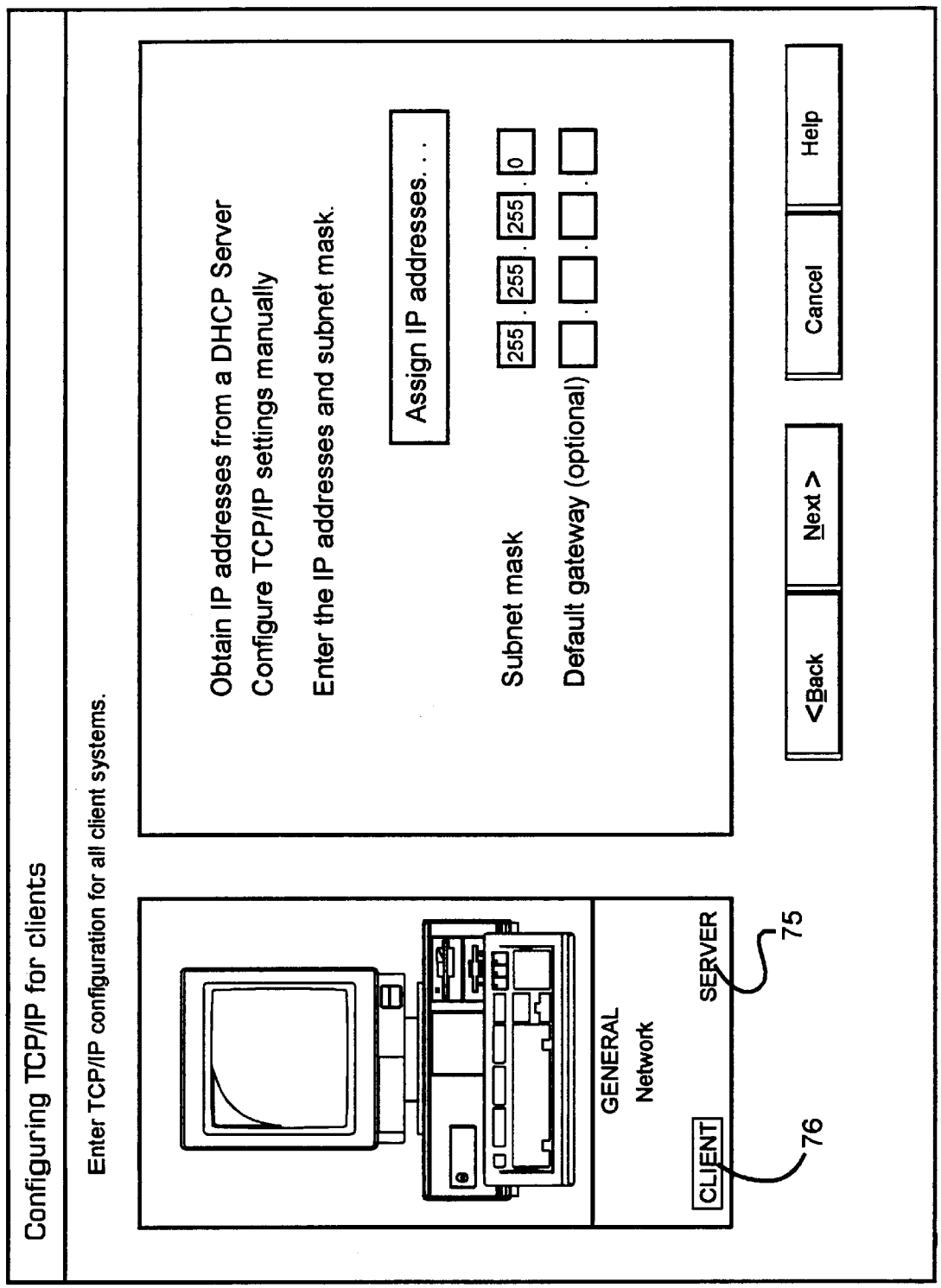
FIG. 18 is a diagrammatic view of an interactive dialog screen on the primary server for the entry to the data file of TCP/IP network related configurations for all client computers.
Figure 19:
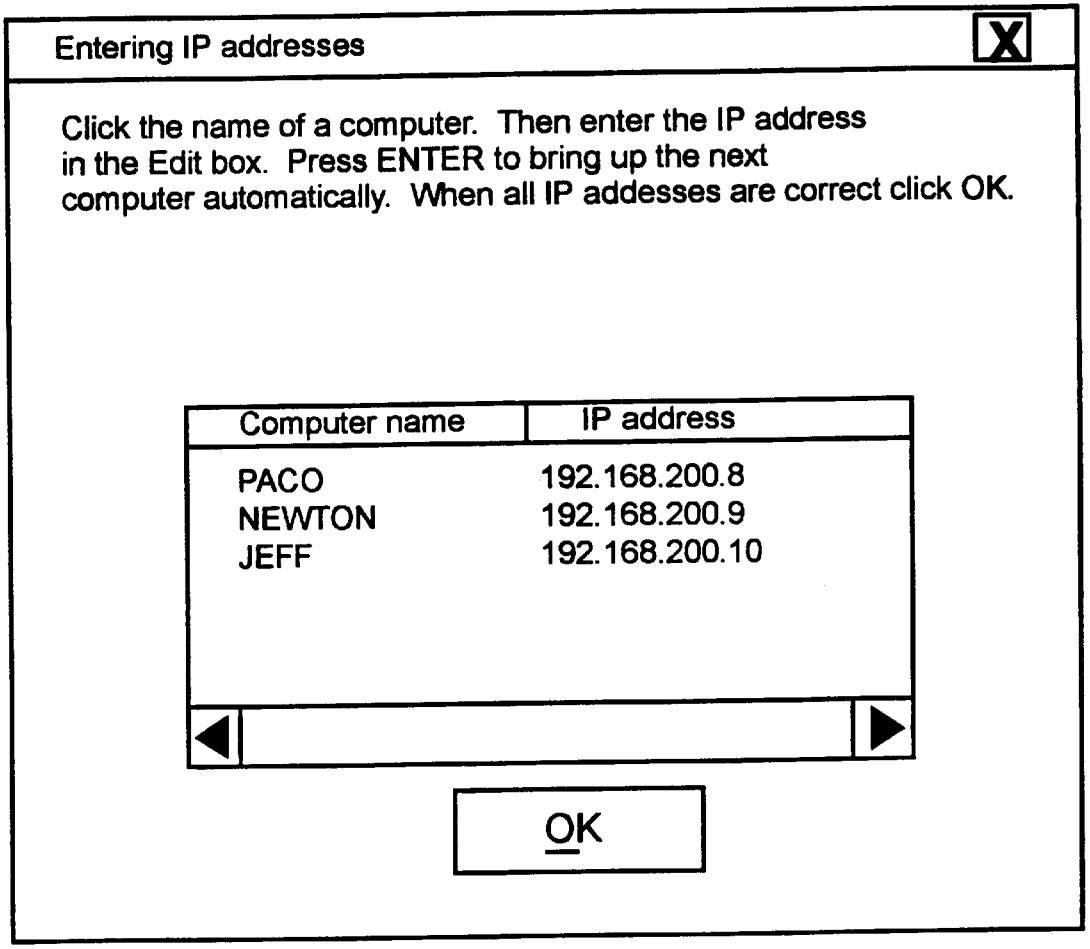
FIG. 19 is a diagrammatic view of an interactive dialog screen on the primary server for the entry to the data file of IP addresses for three client computers.
Figure 20:
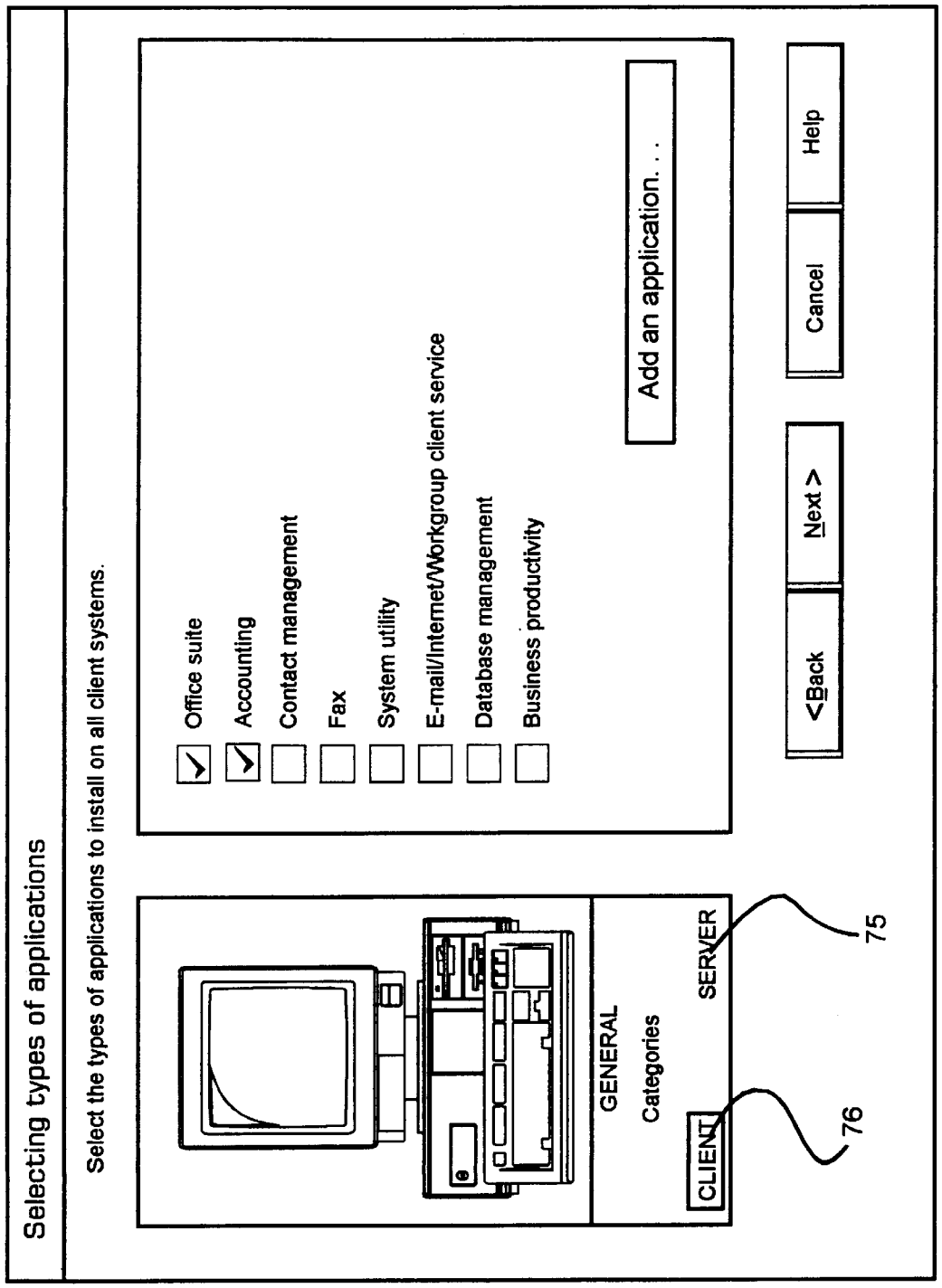
FIG. 20 is a diagrammatic view of an interactive dialog screen on the primary server for the entry to the data file of application programs to be installed on all client computers.
Figure 21:
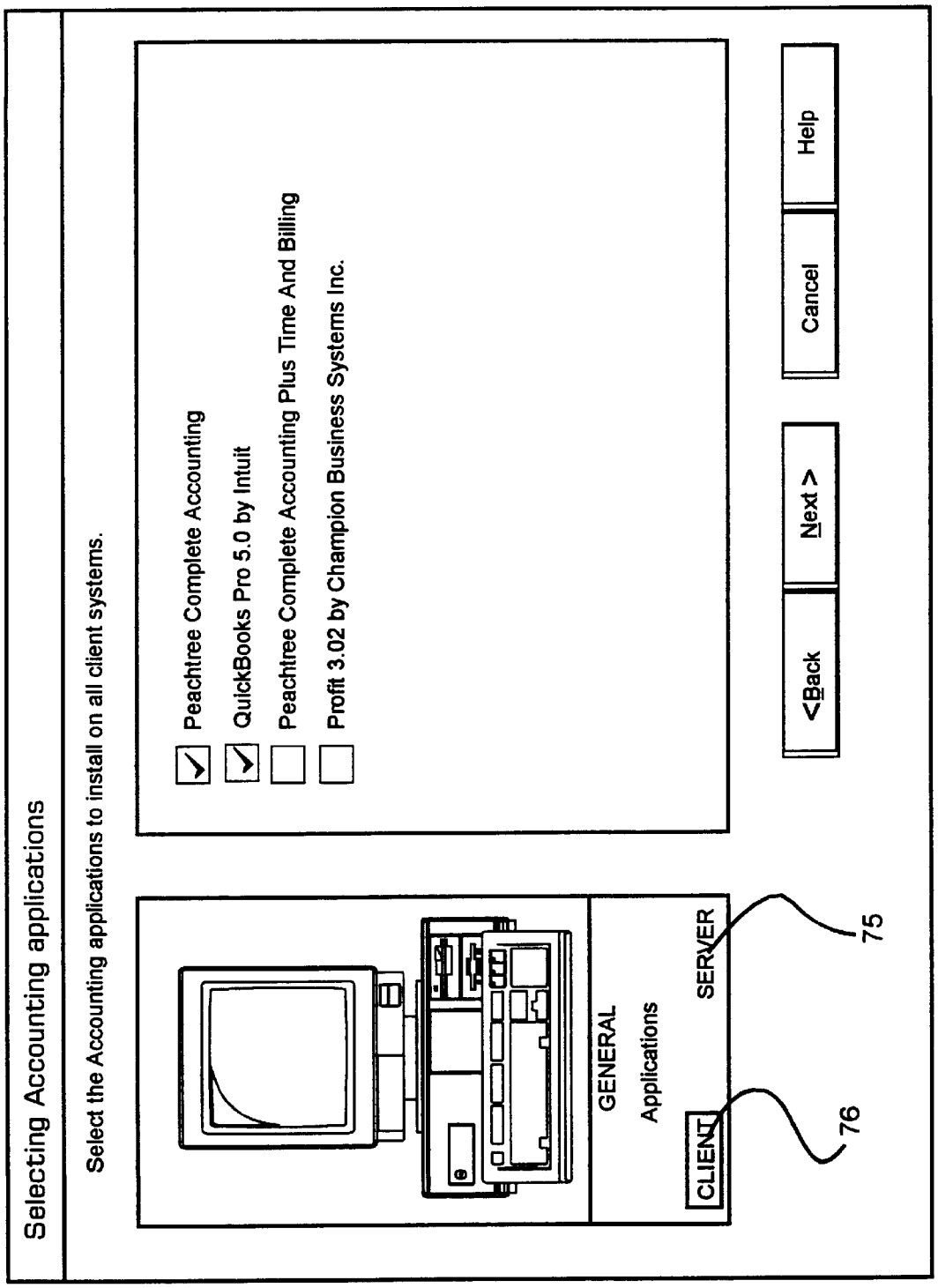
FIG. 21 is a diagrammatic view of an interactive dialog screen on the primary server for the entry to the data file of an accounting application program to be installed on all client computers.
Figure 29A:
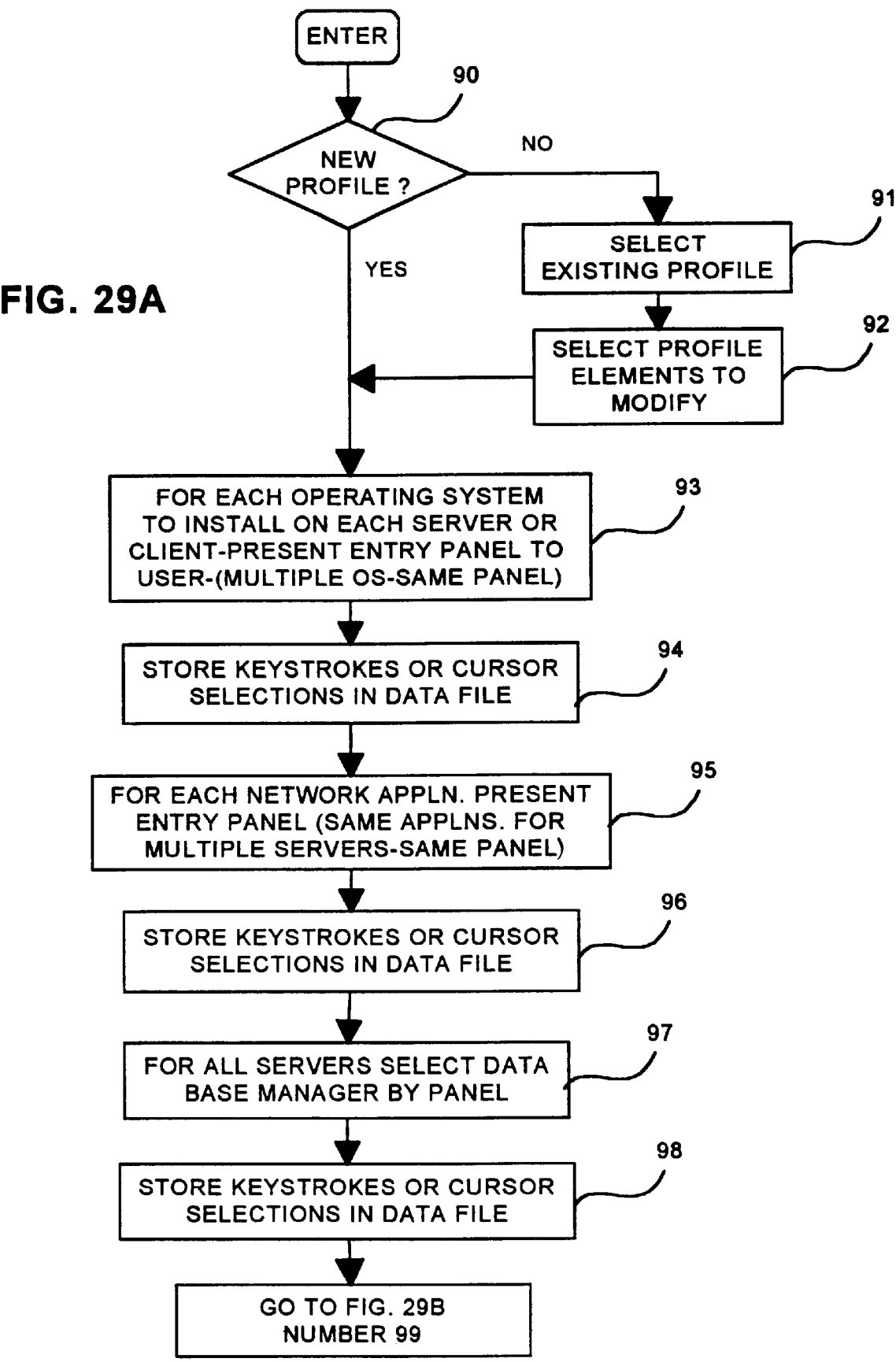
FIGS. 29A and B is a flowchart of a simplified run of the program of FIG. 28.

In the description which follows, the data entry or prompt screen panel description with respect to FIGS. 4 through 27 and the programs described with respect to FIGS. 28 and 29, all relate to the development of the data file of sequential keystroke and cursor selection entries which will be subsequently used to load the selected programs and make the selected settings throughout the network of server and client computers. Although these figures are completely described in the copending Bezanson et al. application which is specifically directed to the development and use of such data files, the description and figures are repeated here so that the present patent will provide a unitary description of all aspects of the present invention. Thus, the screen of FIG. 4 asks the user to indicate whether the network installation is a new, "from scratch", configuration or a modification of an existing network configuration. Selection 71 indicates a new configuration. Selection 71 is stored in the primary server. FIG. 5 merely shows the screen which would have come up if the user chose to modify an existing network configuration. Since a new configuration was chosen, the screen of FIG. 6 comes up and the user enters all of his keystroke and cursor selections all of which are recorded in the primary server. These and the subsequent keystrokes and cursor selections will collectively provide the recorded data files of the present invention. It should be noted that with his selected entries 72 through 74, the user has chosen to install the same operating system for all clients, the same applications for all servers and the same applications for all clients. This should significantly reduce the subsequent entry strokes and cursor selections which need to be recorded since the same entry may be recorded and subsequently used for the multiple installations of the same applications. Then the screen of FIG. 7 solicits entries for setting up the desktop display environment for all of the client computers, after which the screen of FIG. 8 asks for networking configurations for the server computers such as e-mail groups and Internet workgroups and browser applications. Note that on the screen panel, the server indicator 79 is highlighted to show that the entries are applicable to the servers. In any event, all keystroke and cursor selection entries continue to be made into and stored in the primary server 50, FIG. 1. Next, through the screen in FIG. 9, entries selecting database management system for the servers are made. Then, through the display screen of FIG. 10, Internet functions and settings are customized for one of the servers, "Pilot", which is the primary server. Then, through screen panels displayed in FIGS. 12 and 13, the network browser application: "Navigator 3.01" and the database management applications respectively previously selected for the primary server, "Pilot", are customized. Next, FIG. 13, database application components and drivers are selected for the primary server computer through input to the display screen. Then, through the display screen of FIG. 14, network protocols and adapters are selected for all of the client computers. Note that the client indicator 76 is now highlighted to show that the keystroke and cursor selection entries being captured are now applicable to the client computers. Now, through the display panel shown in FIG. 15, one of the client computers, "Paco", is being configured with client settings relative to the windows application to be installed on it. Other client computers, "Newton" and "Jeff", are likewise individually configured as shown respectively in FIGS. 16 and 17. Next, the screen of FIG. 18 shows the entries made to configure TCP/IP network functions for all clients. This brings up the dialog panel of FIG. 19 wherein the IP addresses may be entered or modified for all clients. Next, the screen of FIG. 20, applications to be installed on all client computers are selected and more such selections are made through the screen of FIG. 21.

Figure 23:
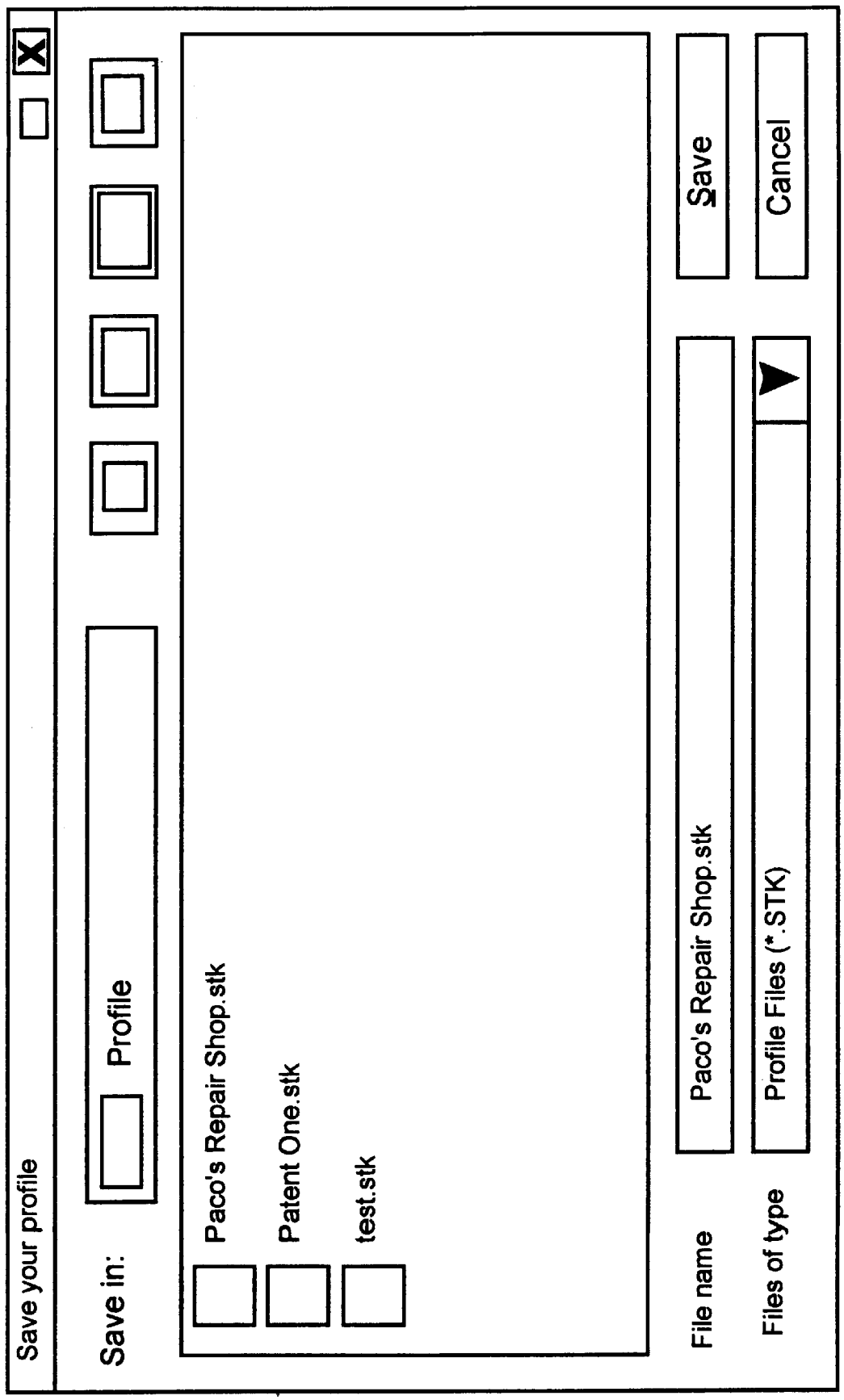
FIG. 23 is a diagrammatic view of an interactive dialog screen on the primary server for the entry of user data to save the profile of FIG. 22 as the data file of the present invention.
Figure 24:
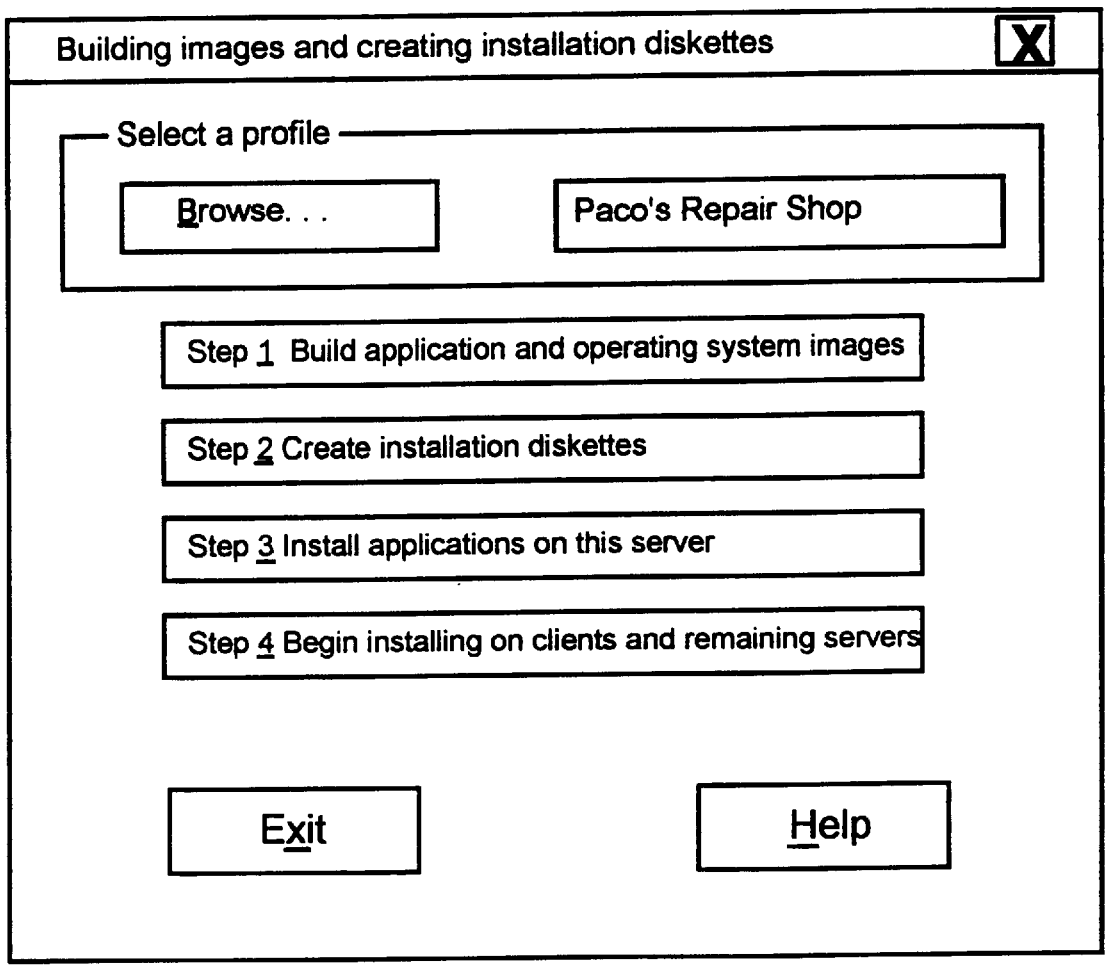
FIG. 24 is a diagrammatic view of an interactive dialog screen on the primary server for the overall entry of commands controlling the installation and the configuration of the network controlled by the keystroke and cursor selections recorded as the data file of the present invention.

The screen of FIG. 22 shows the complete profile as represented by all of the applications loaded into the primary server and all of the keystroke and cursor selection entries stored in the recorded data file to configure a network made up of a primary server and three client computers. It should be obvious that similar profiles could have been developed for a network of several servers plus respective pluralities of client computers. FIG. 23 is the screen panel which is brought up after the user has reviewed the network profile of FIG. 22 to permit the user to save the profile. FIG. 24 is the screen dialog panel through which the user may use the entries described above for the subsequent installation and configuration of the network in accordance with the present invention; it will subsequently be discussed in greater detail.

Figure 25:
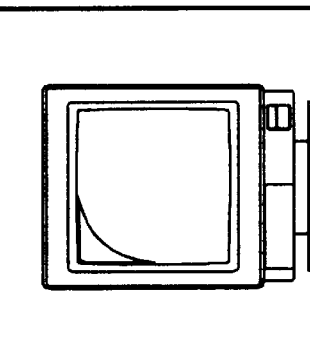
FIG. 25 is a diagrammatic view of an interactive dialog screen on the primary server for the initial entry to the data file of a new network configuration like that of FIG. 6 except that in the present configuration, each of the client computers respectively will have a different set of installed application programs.
Figure 26:
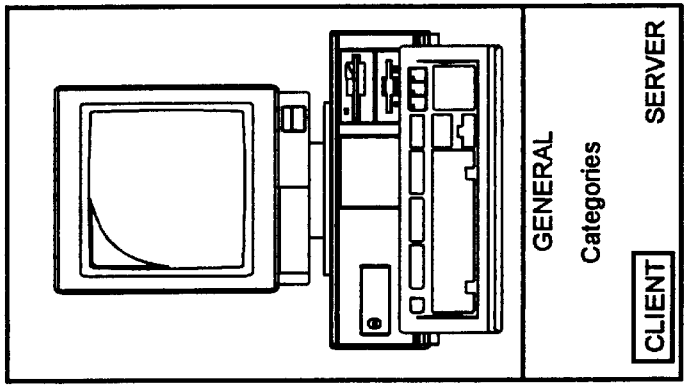
FIG. 26 is a diagrammatic view of an interactive dialog screen on the primary server for the entry to the data file of data selecting a set of application programs for a typical first client in the network of FIG. 25.
Figure 27:
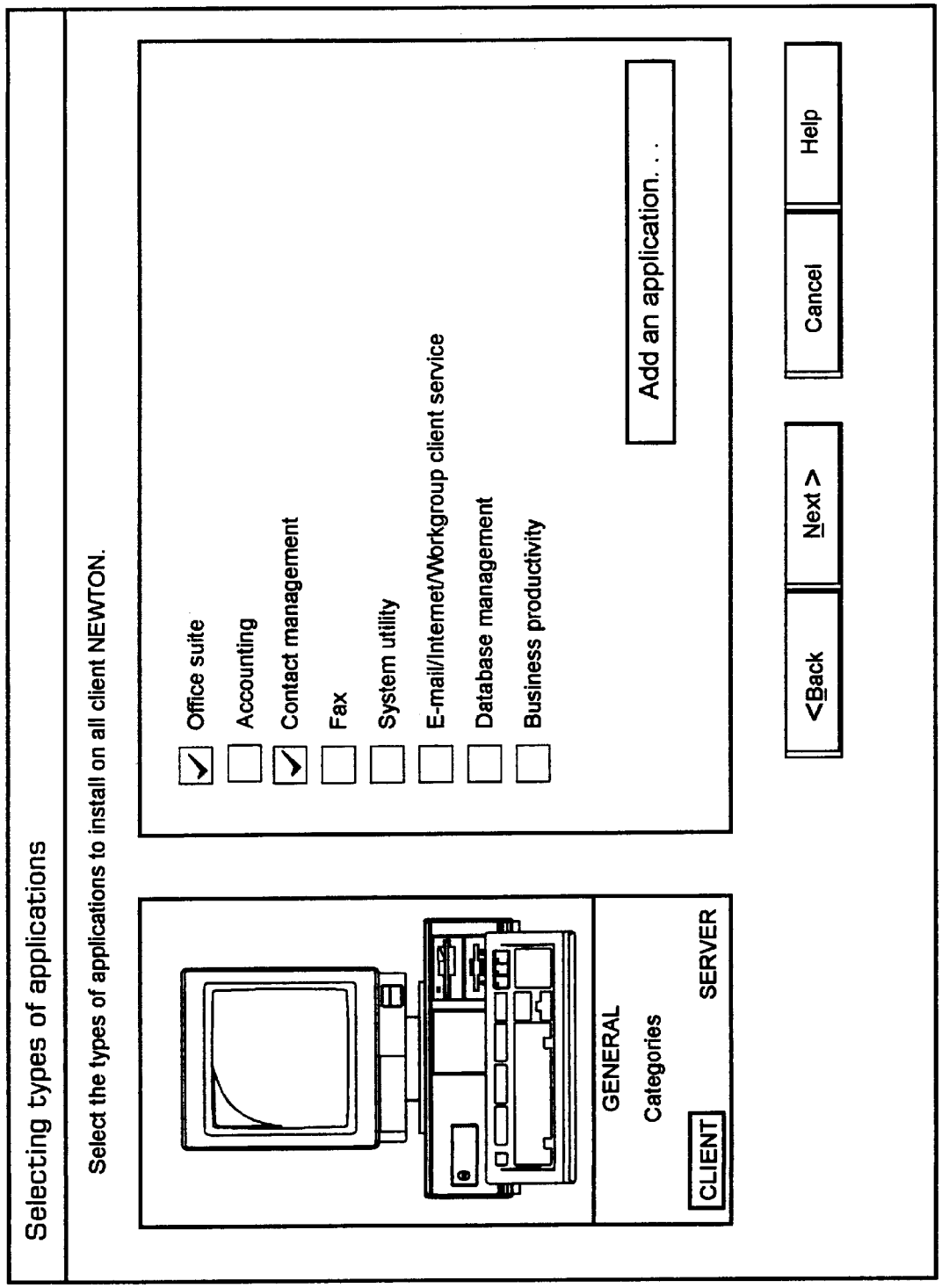
FIG. 27 is a diagrammatic view of an interactive dialog screen on the primary server for the entry of data to the data file selecting a set of application programs for a typical second client in the network of FIG. 25.

In this previous description, we have described the entries made in the configuration of a network in which, for purpose of illustration, all of the same application programs were to be installed in all of the client computers. For purposes of completeness, we will now give an example of entries where different application programs are to be installed on different client computers. FIG. 25 is the screen panel of FIG. 6 except that the user has indicated by the absence of a selection in box 74 that the programs to be installed on all of the clients will not be the same for each client. This results in a sequence of individual selection panels, as typified by the screen panels of FIGS. 26 and 27 each respectively for the client, "Paco", and the client, "Newton", which permits the user to make individual program and related selections unique to each client.

Now, with respect to FIG. 28, there will be generally described the basic elements of the program in the primary server computer which enables the primary server to control the data entry and network installation operations described with respect to FIGS. 3 through 27. Sufficient and readily accessible storage must be provided on the primary server for all of the programs to be subsequently installed for the whole network, step 80. A system is set up for initially loading into the primary server all of the programs to be subsequently installed in the network, step 81. Routines are set up in the primary server for the sequence of prompts described above for the entry of data relative to the selection of operating systems for the server and client computers, step 82. Routines are set up in the primary server for the sequence of prompts described above for the entry of data relative to the selection of adapters for the server and client computers, step 83. Routines are set up in the primary server for the sequence of prompts described above for the entry of data relative to the selection of drivers for network and server and client computer components, step 84. Routines are set up in the primary server for the sequence of prompts described above for the entry of data relative to the selection of settings for network configurations and for server and client computers, step 85. Finally, routines are set up for the capture and storage on the primary server of a data file of all of the keystroke and cursor selection entries described above with respect to FIGS. 3 through 27, step 86.

Now, with respect to FIG. 29, there will be described a modified program run to illustrate many of the steps involved in the prompts, capture of the actual keystrokes and cursor selections responsive to the prompts and the storage of these entries described above for FIGS. 3 through 27. In this illustrative program run, not all of the possible combinations of data entries will be described. However, it should be readily understood how other selections and data entries may be similarly prompted for, selected and stored. In the program run, an initial decision is made, step 90, as to whether an entirely new profile for the network configuration profile is to be developed. If No, then we are dealing with a modification of an existing network configuration, and an existing profile stored as a data file in said primary server is selected for modification, step 91. Then, step 92, the user decides which applications or other network or server or client elements are to be modified. After this selection, or if the configuration of the network of servers and clients is to be entirely new, we proceed to step 93 where the user is presented with a sequence of prompt panels on the primary server displays for appropriate operating system selection for each server and client computer in the network. In this connection, and as set forth in greater detail in the copending Dean et al. application, if the operating systems are to be installed on a plurality of servers or clients, a single entry panel may be used for all of the multiple operating system installations. Then, step 94, the keystroke or cursor selections entered in step 93 are stored in the data file of the primary server. Next, in step 95, the user is presented with a sequence of prompt panels on the primary server displays for appropriate network application selection for each server in the network. Here again, a single entry panel may be used for the same application installation on multiple servers. Then, step 96, the keystroke or cursor selections entered in step 95 are stored in the data file of the primary server. Next, in step 97, the user is presented with a sequence of prompt panels on the primary server displays for appropriate database management selection for each server in the network. Here again, a single entry panel may be used for the same database manager installation on multiple servers. Then, step 98, the keystroke or cursor selections entered in step 97 are stored in the data file of the primary server. Next, in step 99, the user is presented with a sequence of prompt panels on the primary server displays for customized Internet settings for each server and client in the network. Then, step 100, the keystroke or cursor selections entered in step 99 are stored in the data file of the primary server. Next, in step 101, the user is presented with a sequence of prompt panels on the primary server displays for selecting network adapters for each server and client in the network. Then, step 102, the keystroke or cursor selections entered in step 101 are stored in the data file of the primary server. Now we come in step 103 to the installation of application programs. The user is presented with a sequence of prompt panels on the primary server displays for selecting the application programs for each server and client in the network. Here again, a single entry panel may be used for the same application program installation on multiple servers or clients. Then, step 104, the keystroke or cursor selections entered in step 103 are stored in the data file of the primary server. Finally, in step 105, the user is presented with a sequence of prompt panels on the primary server displays for selecting all other settings for each server and client in the network and the keystroke or cursor selections entered are stored in the data file of the primary server. The result is a completed new or modified network configuration stored as the sequence of keystroke and cursor selections described above and stored in the data file of the primary server, step 106. This data file will now be used in the subsequent installation of programs and configuration of the network via the primary server.

The installation of the programs loaded into the primary server and distributed along with all settings and configurations throughout the network will now be described with respect to FIGS. 24 and 30. FIG. 24 shows a display panel for the primary server used for the interactive control of this distribution and network configuration, and FIG. 30 is a flowchart of the steps involved in this process. The user selects Step 1, 120 in the panel of FIG. 24 and the primary server constructs installation display screens, step 110 of FIG. 30, which will be used to monitor the subsequent installation of application programs and operating systems. The content of such installation screens will be based upon the data file profile developed by the process of FIG. 29. Then, through entry 121, FIG. 24, installation diskettes are produced on the primary server for every server or client computer in the network which is to have any installation or setting entered, step 111, FIG. 30. These diskettes, which are installed on the servers and clients by initiating input 121, FIG. 24, to activate, step 113, FIG. 30, to provide each of these computers with the minimum data processing capability needed to bring them on line in the network so that the installations and settings may be subsequently distributed to them from the primary server via the network. Meanwhile, through the activation of input 122, FIG. 24, step 112, FIG. 30, is set off to load into the primary server the applications and programs to be installed throughout the network. It should be noted that all of these installations are being made to embody the network represented by the data file profile produced by the procedure of FIG. 29.

At this point, the actual configuration and distribution to set up the network may be commenced through input 123 in the panel of FIG. 24. This activates step 114 in the flowchart of FIG. 30 and begins the unattended installation of the programs preloaded on the primary server to the other servers and clients in the network, as well as the configuration and customization of such computers and the overall network based upon the recorded keystrokes and cursor selections make up the data file profile. This continues until the installation and configuration ends, step 116, as determined by decision step 115.

A variation of the above procedure could involve holding off on the installation of the diskettes which would enable the various servers and clients with the minimal required network function until all of the programs have been preloaded onto the primary server. Then the installation of the diskettes into their respective server or client computers could actually trigger the distribution and program installation into that respective computer.

Although certain preferred embodiments have been shown and described, it will be understood that many changes and modifications may be made therein without departing from the scope and intent of the appended claims.

What is claimed is:

1. A method for installing programs, settings and configurations in a network of at least one server computer and a plurality of client computers comprising the steps of:
   designating one of said server computers having an interactive display interface to function as a primary server computer;
   preloading into said primary server computer all of the programs to be installed in said server and client computers of said network; and
   running a sequence of the keystroke and cursor entries required to install selected components and programs on said server and client computers recorded in a data file stored in said primary server computer;

whereby said programs and components are automatically loaded into the respective server and client computers in said network requiring said programs and components.

2. The method of claim 1 wherein said network comprises a plurality of server computers.

3. The method of claim 2 further including the steps of:

preloading into the primary server, operating systems to be installed in said server and client computers of said network, and running a sequence of the keystroke and cursor entries required to install said operating systems on said server and client computers recorded in a data file stored in said primary server computer.

4. The method of claim 3 further including the step of:

running a sequence of the keystroke and cursor entries required to select adapters used to support components for said server and client computers recorded in a data file stored in said primary server computer.

5. The method of claim 3 further including the step of:

running a sequence of the keystroke and cursor entries required to select network adapters used to support components for said server and client computers recorded in a data file stored in said primary server computer.

6. The method of claim 3 further including the step of:

running a sequence of the keystroke and cursor entries required to make settings for components and programs installed on said server and client computers recorded in a data file stored in said primary server computer.

7. The method of claim 2 wherein a plurality of the same programs, each of which is to be installed on one of a corresponding plurality of server and client computers are respectively installed by running the same sequence of the keystroke and cursor entries required to install the programs on said server and client computers.

8. The method of claim 2 wherein a plurality of the same components, each of which is to be installed on one of a corresponding plurality of server and client computers are respectively installed by running the same sequence of the keystroke and cursor entries required to install the components on said server and client computers.

9. A computer program having program code included on a computer readable medium for installing programs, settings and configurations in a network of at least one server computer and a plurality of client computers comprising:

means for designating one of said server computers having an interactive display interface to function as a primary server computer;

means for preloading into said primary server computer all of the programs to be installed in said server and client computers of said network; and means for running a sequence of the keystroke and cursor entries required to install selected components and programs on said server and client computers recorded in a data file stored in said primary server computer;

whereby said programs and components are automatically loaded into the respective server and client computers in said network requiring said programs and components.

10. The computer program of claim 9 wherein said network comprises a plurality of server computers.

11. The computer program of claim 10 further including:

means for preloading into the primary server, operating systems to be installed in said server and client computers of said network, and means for running a sequence of the keystroke and cursor entries required to install said operating systems on said server and client computers recorded in a data file stored in said primary server computer.

12. The computer program of claim 11 further including:

means for running a sequence of the keystroke and cursor entries required to select adapters used to support components for said server and client computers recorded in a data file stored in said primary server computer.

13. The computer program of claim 11 further including means for running a sequence of the keystroke and cursor entries required to select network adapters used to support components for said server and client computers recorded in a data file stored in said primary server computer.

14. The computer program of claim 11 further including means for running a sequence of the keystroke and cursor entries required to make settings for components and programs installed on said server and client computers recorded in a data file stored in said primary server computer.

15. The computer program of claim 9 further including means for respectively installing a plurality of the same programs, each of which is to be installed on one of a corresponding plurality of server and client computers, by running the same sequence of the keystroke and cursor entries required to install the programs on said server and client computers.

16. The computer program of claim 10 further including means for respectively installing a plurality of the same components, each of which is to be installed on one of a corresponding plurality of server and client computers, by running the same sequence of the keystroke and cursor entries required to install the components on said server and client computers.

* * * * *